US008327279B2

(12) United States Patent
Yamamoto et al.

(10) Patent No.: US 8,327,279 B2
(45) Date of Patent: Dec. 4, 2012

(54) INFORMATION PRESENTATION DEVICE AND INFORMATION PRESENTATION METHOD

(75) Inventors: Kakuya Yamamoto, Hyogo (JP); Keiji Sugiyama, Kyoto (JP); Hideaki Nakaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 1559 days.

(21) Appl. No.: 11/792,224

(22) PCT Filed: Nov. 28, 2005

(86) PCT No.: PCT/JP2005/021823
§ 371 (c)(1),
(2), (4) Date: Jun. 4, 2007

(87) PCT Pub. No.: WO2006/064655
PCT Pub. Date: Jun. 22, 2006

(65) Prior Publication Data
US 2008/0141127 A1 Jun. 12, 2008

(30) Foreign Application Priority Data
Dec. 14, 2004 (JP) .................................. 2004-361610

(51) Int. Cl.
*G06F 3/00* (2006.01)

(52) U.S. Cl. .......... 715/757; 715/848; 715/849; 701/36; 345/8

(58) Field of Classification Search .................. 715/757
See application file for complete search history.

(56) References Cited

U.S. PATENT DOCUMENTS

| 5,293,513 | A | * | 3/1994 | Umezu et al. | 307/10.1 |
| 6,208,933 | B1 | * | 3/2001 | Lazar | 701/409 |
| 6,500,008 | B1 | * | 12/2002 | Ebersole et al. | 434/226 |
| 6,559,870 | B1 | * | 5/2003 | Anabuki et al. | 715/849 |
| 6,675,091 | B2 | * | 1/2004 | Navab | 701/517 |
| 6,947,219 | B1 | * | 9/2005 | Ou | 359/630 |
| 7,643,215 | B2 | * | 1/2010 | Shin et al. | 359/630 |

(Continued)

FOREIGN PATENT DOCUMENTS
JP 3-031033 2/1991
(Continued)

OTHER PUBLICATIONS
Fujimoto et al., JP Publication 07-257228, published Oct. 9, 1995.*
(Continued)

*Primary Examiner* — William Bashore
*Assistant Examiner* — Reza Nabi
(74) *Attorney, Agent, or Firm* — Wenderoth Lind & Ponack, L.L.P.

(57) ABSTRACT

An information presentation device includes a status information obtaining unit which obtains status information regarding a status of the user; an observed line of sight predicting unit which predicts, based on the status information, an observed line of sight of the user who observes the outside world; and a presented information obtaining unit which obtains the information to be presented to the user. Additionally, a recognized line of sight predicting unit predicts a recognized line of sight of the user who recognizes the presented information; a presentation method determining unit determines a presentation method of the presented information based on the observed line of sight and the recognized line of sight; and an information presenting unit presents the presented information in the method determined in the presentation method determining unit.

13 Claims, 37 Drawing Sheets

U.S. PATENT DOCUMENTS

| | | | | |
|---|---|---|---|---|
| 7,796,155 | B1* | 9/2010 | Neely et al. | 348/157 |
| 8,049,609 | B2* | 11/2011 | Takahashi et al. | 340/461 |
| 8,055,296 | B1* | 11/2011 | Persson et al. | 455/556.1 |
| 2002/0021461 | A1* | 2/2002 | Ono et al. | 359/13 |
| 2002/0049534 | A1* | 4/2002 | Yuda et al. | 701/209 |
| 2002/0154070 | A1* | 10/2002 | Sato et al. | 345/8 |
| 2004/0179104 | A1* | 9/2004 | Benton | 348/207.99 |
| 2004/0238732 | A1* | 12/2004 | State et al. | 250/250 |
| 2005/0111698 | A1* | 5/2005 | Kawai | 382/103 |
| 2006/0028400 | A1* | 2/2006 | Lapstun et al. | 345/8 |
| 2007/0008341 | A1* | 1/2007 | Endo et al. | 345/633 |
| 2007/0159309 | A1* | 7/2007 | Ito et al. | 340/425.5 |
| 2007/0194171 | A1* | 8/2007 | Diamandis et al. | 244/10 |
| 2007/0273557 | A1* | 11/2007 | Baillot | 340/988 |
| 2007/0273610 | A1* | 11/2007 | Baillot | 345/8 |
| 2008/0147325 | A1* | 6/2008 | Maassel et al. | 702/5 |
| 2008/0278821 | A1* | 11/2008 | Rieger | 359/630 |
| 2009/0040233 | A1* | 2/2009 | Yamamoto | 345/592 |
| 2009/0189373 | A1* | 7/2009 | Schramm et al. | 280/731 |
| 2009/0240426 | A1* | 9/2009 | Akita et al. | 701/201 |
| 2009/0273542 | A1* | 11/2009 | Yamamoto | 345/8 |
| 2010/0033404 | A1* | 2/2010 | Hamadou et al. | 345/8 |
| 2010/0045783 | A1* | 2/2010 | State et al. | 348/53 |
| 2010/0313146 | A1* | 12/2010 | Nielsen et al. | 715/757 |
| 2011/0050727 | A1* | 3/2011 | Mukawa | 345/636 |
| 2011/0164163 | A1* | 7/2011 | Bilbrey et al. | 348/333.01 |
| 2011/0227717 | A1* | 9/2011 | Kumon | 340/441 |
| 2012/0011142 | A1* | 1/2012 | Baheti et al. | 707/769 |

FOREIGN PATENT DOCUMENTS

| | | |
|---|---|---|
| JP | 7-257228 | 10/1995 |
| JP | 9-101477 | 4/1997 |
| JP | 10-320167 | 12/1998 |
| JP | 2000-276610 | 10/2000 |
| JP | 2004-118418 | 4/2004 |

OTHER PUBLICATIONS

Partial English translation of JP 10-320167 published Dec. 4, 1998.
Partial English translation of JP 03-031033 published Feb. 8, 1991.
Partial English translation of JP 2004-118418 published Apr. 15, 2004.

* cited by examiner

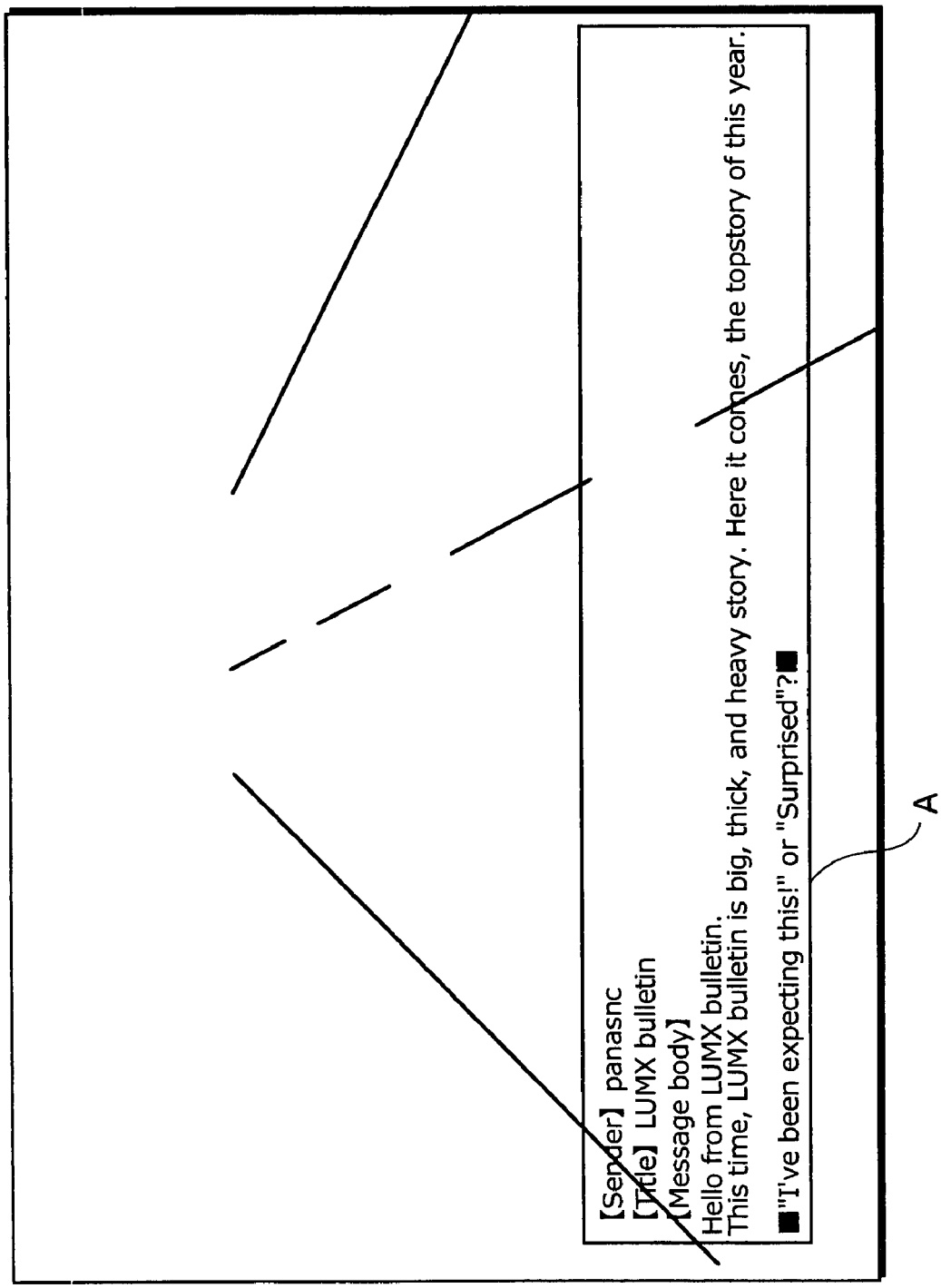

FIG. 9A

| Status | Observed line of sight |
|---|---|
| Uniform motion | Uniform motion |
| Going straight through intersection | Look right and left |

FIG. 9B

| Status | Probability | Observed line of sight |
|---|---|---|
| Go straight | 80% | Right→left→front |
| Turn right | 20% | Right→left→right |
| Turn left | 0% | Left→right→left |
| Return | 0% | Rotate by 180 degrees |

FIG. 11A

| Presented information | Recognition speed |
|---|---|
| Electronic mail | 5 characters/second |
| Television program | 1 scene/second |

FIG. 11B

| Importance | Recognition speed |
|---|---|
| A | 3 characters/second |
| B | 4 characters/second |
| C | 5 characters/second |
| D | 6 characters/second |
| E | 7 characters/second |

FIG. 15

| Presented information | Presentation method |
|---|---|
| Electronic mail | Projective presentation method |
| Television program | Part presentation method |
|  |  |

INFORMATION PRESENTATION DEVICE AND INFORMATION PRESENTATION METHOD

BACKGROUND OF THE INVENTION

1. Technical Field

The present invention relates to an information presentation device which presents information to a user.

2. Background Art

In recent years, information presentation devices referred to as Head Mounted Display (HMD) and each having a shape such as goggles or a helmet are becoming available. When a user fits an HMD to the head, images are respectively presented immediately in front of the left and right eyes. By presenting the images at the left and right side in a slightly different manner, some information presentation devices can give a three-dimensional appearance to an object. The information presented to the user is not limited to a still image. Text and video, such as a television program, can be presented to the user.

The HMDs can be broadly classified into two types. One is the hermetically-closed type in which only a virtual image is presented to the user by blocking incident ambient light. Another type is the see-through type in which a virtual image is presented to the user along with a natural image via incident ambient light.

With the see-through HMD, it is possible to recognize information even when the user performs an activity (such as walking). However, there are cases where it is difficult to recognize information presented to the user (referred to as "presented information" hereinafter) due to the relations between a scene of the outside world and the presented information.

For example, when the color of the presented information is similar to the color of a portion where the outside world and this presented information overlap with each other, it becomes difficult to recognize the presented information. Thus, the HMD which controls the color of presented information according to the color of the outside world has been suggested (for example, Patent Reference 1).

This conventional HMD is equipped with a camera which monitors the outside world, and the camera detects the color of the outside world. Then, the HMD judges whether or not the color of the presented information is similar to the color of a portion where the outside world and this presented information overlap with each other. When they are similar, the HMD changes the color of the presented information. With this, it becomes possible to present information with the color dissimilar to the color of the outside world. Thus, it does not lead to a problem that the user has difficulties in recognizing the presented information due to the relations with the outside world.

Patent Reference 1: Japanese Unexamined Patent Application Publication No. 9-101477

SUMMARY OF THE INVENTION

However, there is a problem in the conventional HMD that the user can not view information at ease when recognizing information required to take certain time to view, such as long text information and a television program. In other words, when the user recognizes long text and a television program, it is expected that the user can not carefully observe the outside world, while the user is preoccupied with the recognition of the presented information. It is obvious that it becomes possible to ensure more safety, as long as the user intends to carefully observe the outside world. However, it interferes with the recognition of the presented information.

Thus, the present invention is conceived in view of such problem, and the object is to provide an information presentation device which allows the user to recognize presented information while ensuring more safety.

In order to achieve the object, the information presentation device according to the present invention is an information presentation device which presents information to a user, and includes a status information obtaining unit that obtains status information regarding a status of the user; an observed line of sight predicting unit that predicts an observed line of sight of the user who observes the outside world, based on the status information obtained by the status information obtaining unit; a presented information obtaining unit that obtains information to be presented to the user; a recognized line of sight predicting unit that predicts a recognized line of sight of the user who recognizes the presented information obtained by the presented information obtaining unit; a presentation method determining unit that determines, based on the observed line of sight and the recognized line of sight, a method for presenting the presented information obtained by the presented information obtaining unit, the observed line of sight being predicted by the observed line of sight predicting unit and the recognized line of sight being predicted by the recognized line of sight predicting unit; and an information presenting unit that presents the presented information in the presentation method, the presented information being obtained by the presented information obtaining unit and the presentation method being obtained by the presentation method determining unit. With this, since it becomes possible to present information based on two types of lines of sight, that is, an observed line of sight and a recognized line of sight, it allows the user to recognize presented information while the safety of the user is further ensured.

More specifically, it is possible that the status information obtaining unit obtains information regarding a route of the user, and the presentation method determining unit protectively places the presented information along the route of the user. With this, the load of the movement of lines of sight can be reduced, and it is possible to allow the user to recognize presented information while the safety of the user is further ensured.

Alternatively, it is possible that the status information obtaining unit obtains information regarding a route of the user, and the presentation method determining unit places parts of the presented information in chrolonological order along the route of the user. With this, the load of the movement of lines of sight can be reduced, and it is possible to allow the user to recognize presented information while the safety of the user is further ensured.

More specifically, the observed line of sight predicting unit predicts, on a predetermined time basis, sight points of the user who observes the outside world, the recognized line of sight predicting unit predicts, on a predetermined time basis, sight points of the user who recognizes the presented information, and the presentation method determining unit obtains, on a predetermined time basis, an intersection point of the observed line of sight and a plane, and an intersection point of the recognized line of sight and the plane, and determines a presentation method of the presented information so that a distance between the intersection points falls within a predetermined range.

With this, the load of the movement of lines of sight can be reduced by limiting a predetermined range to a short distance, and the user can recognize presented information while the safety of the user is further ensured. Furthermore, even when it is not possible to precisely predict either an observed line of sight or a recognized line of sight, or even when it is not possible to control a presentation method of presented information in details, there are effects that can improve the presentation method to a certain extent.

Furthermore, by preventing the difference between the observed line of sight and the recognized line of sight from being 0, there are effects that can avoid interfering with the recognition of the outside world in the vicinity of the user that completely overlaps with the presented information.

Here, it is possible that the recognized line of sight predicting unit divides the presented information into plural parts, and the presentation method determining unit determines a presentation method for each of the divided parts. With this, the user can recognize not only text information but still image such as a picture, and video such as a television program at ease, while walking along a street.

Furthermore, it is possible that the status information obtaining unit obtains object information regarding an object which is present on a route of the user, and the presentation method determining unit places the presented information so that the user looks to the object. With this, since the line of sight of the user looks to the attention object, it is possible to further ensure the safety of the user.

Alternatively, it is possible that the status information obtaining unit obtains object information regarding an object which is present on a route of the user, and the presentation method determining unit places the presented information so that the user does not look to the object. With this, since the line of sight of the user does not look to the gaze avoidance object, it is possible to further ensure the safety of the user.

Here, it is possible that the observed line of sight predicting unit predicts plural observed lines of sight depending on statuses of the user which are probable to occur, the observed lines of sight being suitable for each of the statuses. With this, it becomes possible to select, as an observed line of sight, a line of sight according to an activity pattern and a preference of the user.

Similarly, it is possible that the recognized line of sight predicting unit predicts plural recognized lines of sight depending on respective parts of the presented information, the recognized lines of sight having respective speeds suitable for recognizing each of the parts. With this, it becomes possible to read an important part at a slow speed, and a not important part at a fast speed. Furthermore, when a line of sight which recognizes an event which is the most important to the user among events in the vicinity of the user is selected, the user's line of sight moves with the recognition of the presented information. Thus, the user can come to notice the important event.

Furthermore, it is possible that the status information obtaining unit obtains information regarding a route of the user, and the presentation method determining unit places the presented information at a position of an intersection in which the user looks right and left, when the user is entering the intersection. With this, since it is possible to allow the user who is entering an intersection to look right and left, it becomes possible to enhance more safety of the user.

The present invention can be realized, not only as the aforementioned information presentation device, but also as an information presentation method having the characteristic units of the aforementioned information presentation device as steps, and as a program causing a computer to execute such steps. Furthermore, it is obvious that such program can be distributed via a recording medium, such as a CD-ROM and the like, and via a transmission medium, such as the Internet and the like.

As clarified in the aforementioned description, with the information presentation device according to the present invention, the load of the movement of lines of sight can be reduced, and the user can recognize presented information while the safety of the user is further ensured.

BRIEF DESCRIPTION OF DRAWINGS

FIG. 8 is a diagram showing a state viewed from the user.

FIGS. 9A and 9B are diagrams each showing an example of reference information stored in the observed line of sight prediction reference storage unit.

FIGS. 11A and 11B are diagrams each showing an example of the reference information stored in the visually recognized line of sight prediction reference storage unit.

FIG. 15 is a diagram showing an example of presentation method information stored in the presentation method storage unit.

NUMERICAL REFERENCES

Figure 1:
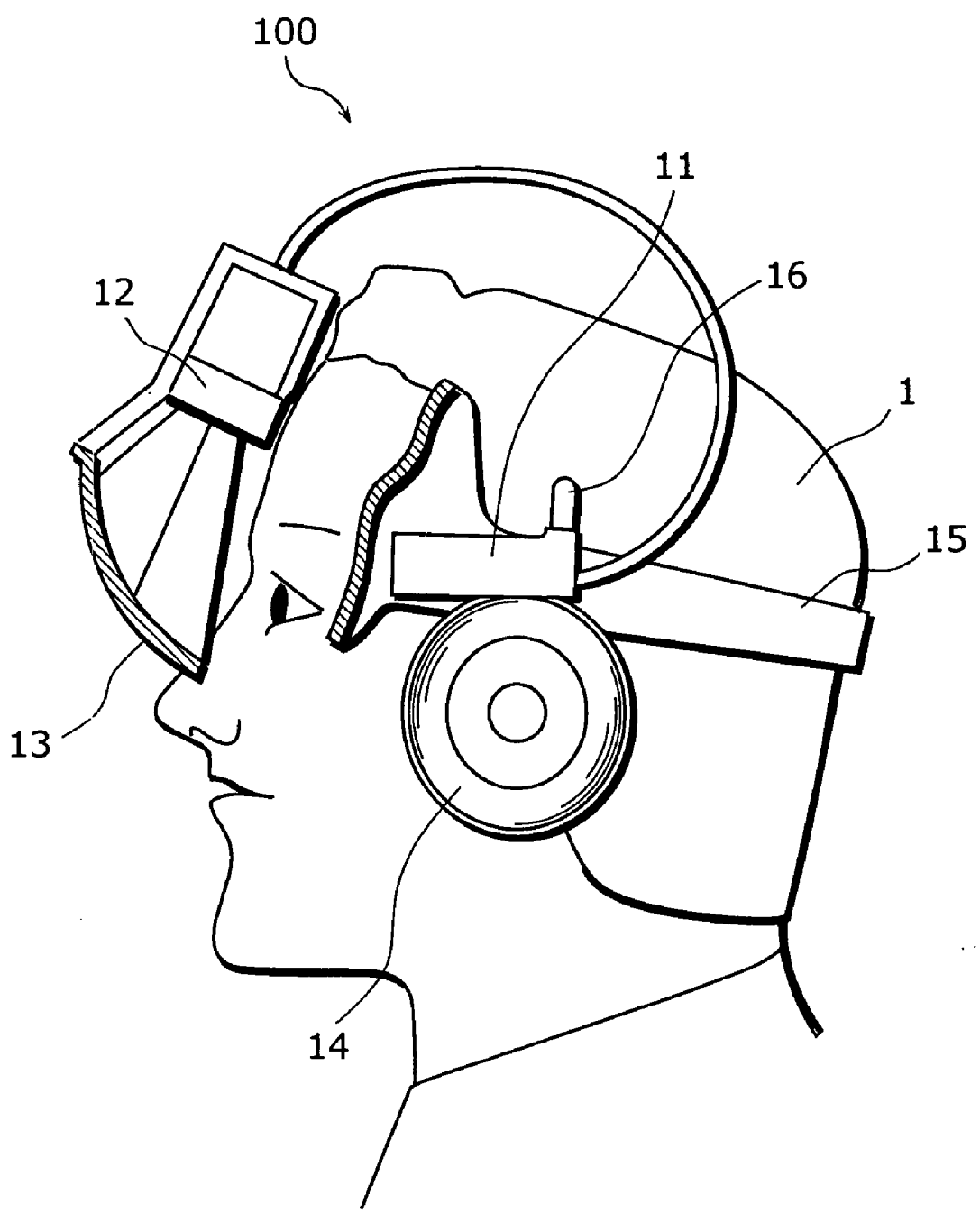
FIG. 1 is a diagram showing the state where the user fits an HMD according to the present invention.

1 User's head
11 Calculator
12 Display device (LCD)
13 Optical element
14 Headphones
15 Fitting component
16 Receiver
17 Cable
18 Storage unit
101 Status information obtaining unit
102 Observed line of sight predicting unit
103 Presented information obtaining unit
104 Recognized line of sight predicting unit
105 Presentation method determining unit
106 Information presenting unit

DETAILED DESCRIPTION OF THE INVENTION

The embodiments of the present invention are described in details with reference to the diagrams. Herein, an HMD is exemplified as the information presentation device according to the present invention.

(First Embodiment)

FIG. 1 is a diagram showing the state where the user fits an HMD 100 according to the present invention to the head.

As shown in this diagram, the HMD 100 according to the present invention has an appearance similar to a conventional HMD. It includes: a calculator 11 which performs various kinds of control in order to present information to the user; a display device 12 such as a Liquid Crystal Display (LCD); an optical element (presentation screen) 13 placed in front of the user's eyes; headphones for audio guidance 14; a fitting component 15 for fitting the HMD to the user's head; and a receiver 16 for receiving presented information from the Internet and the like.

One surface of the optical element 13 is a concave aspheric face to which a half-mirror coating is applied and on which a virtual image is created reflecting the information displayed on the display device 12a. The other surface of the optical element 13 is a convex face which is the almost aspheric face as the aforementioned concave face, and which allows the outside world to be viewed. With this, the user can recognize the information displayed on the display device 12 and overlapped with the outside world.

Figure 2:
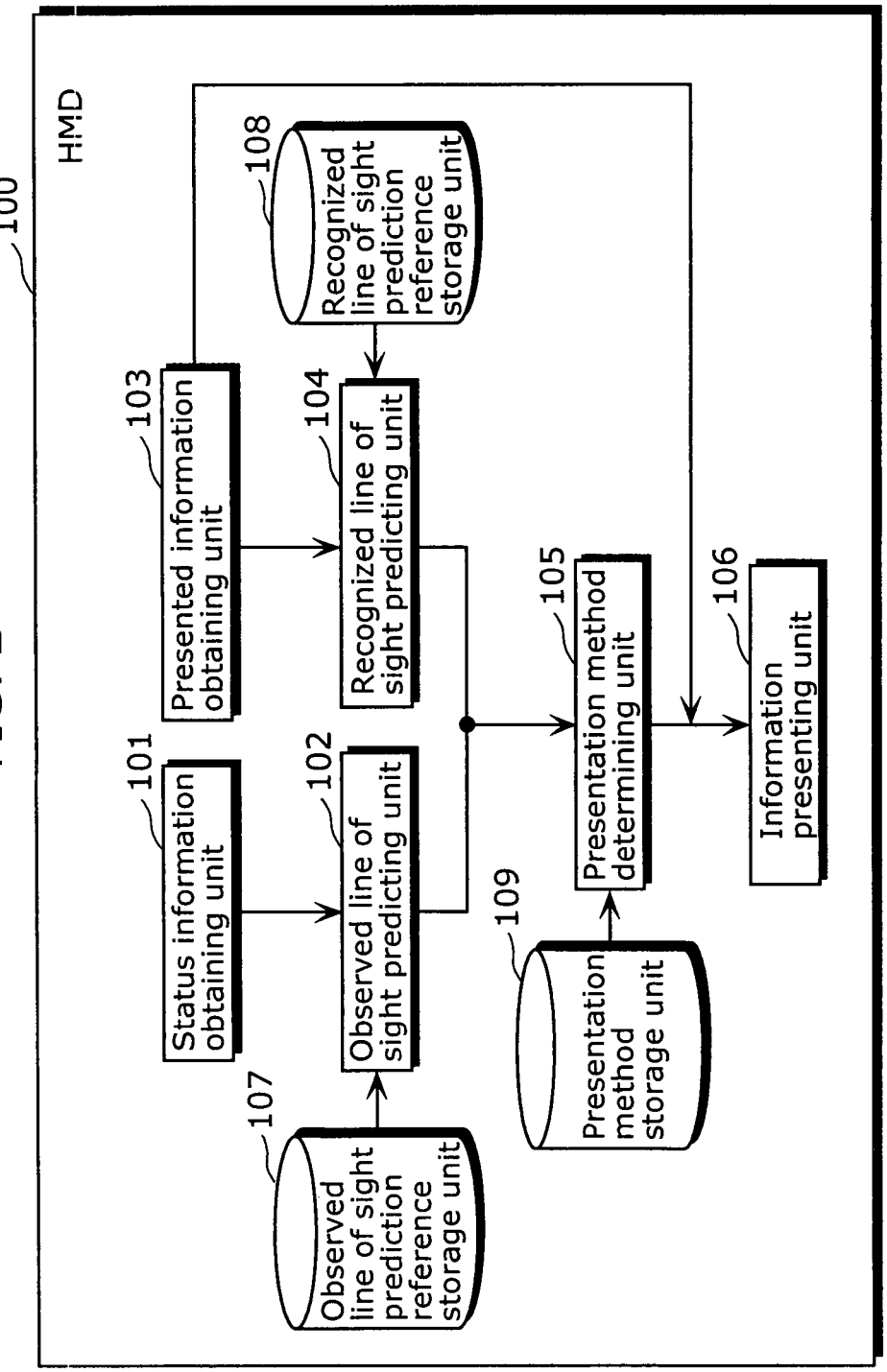
FIG. 2 is a functional block diagram of the substantial units of the HMD according to the present invention.

FIG. 2 is a functional block diagram of the substantial units of the HMD 100 according to the present invention. This HMD 100 is a unit which presents information to the user. Functionally, it includes: a status information obtaining unit 101; an observed line of sight predicting unit 102; a presented information obtaining unit 103; a recognized line of sight predicting unit 104; a presentation method determining unit 105; an information presenting unit 106; an observed line of sight prediction reference storage unit 107; a recognized line of sight prediction reference storage unit 108; and a presentation method storage unit 109.

The status information obtaining unit 101 is a camera, a Global Positioning System (GPS), an acceleration sensor, an angle sensor, a magnetic sensor, or the like which obtains status information regarding a status of the user. The status information is information regarding a current position of the user, map information, a direction and a speed of the movement of the user, and a physical condition of the user (each position of the body parts: such as the head and eyeballs; an orientation; a posture; a heart rate; temperature; and the like). By accumulating the past activity histories of the user and setting, in advance, the future activity schedule (a destination and the like), it becomes possible to use such information as status information.

Figure 3:
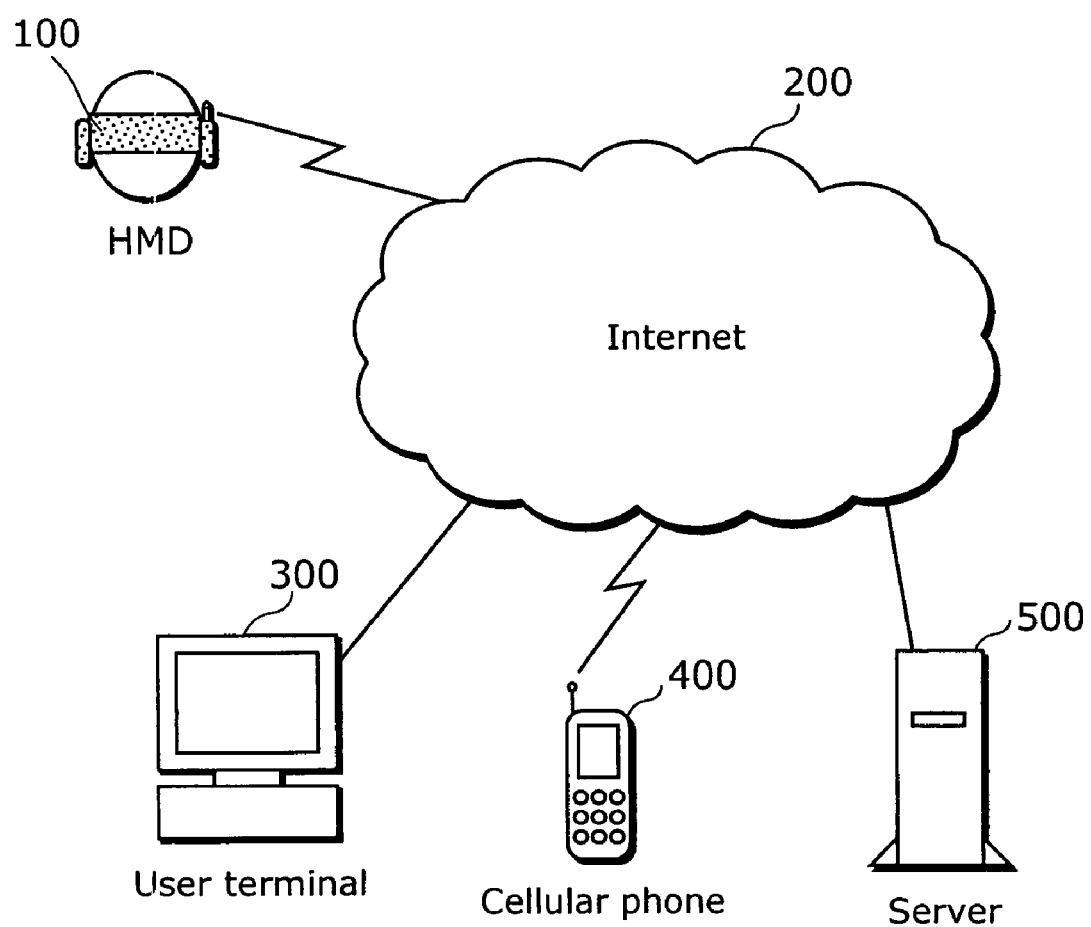
FIG. 3 is a diagram showing a condition when the HMD according to the present invention obtains map information.

FIG. 3 is a diagram showing a condition when the HMD 100 according to the present invention obtains map information. In other words, the status information obtaining unit 101 of the HMD 100 obtains, via an Internet 200, the map information from: a terminal 300 installed in a home of the user; a cellular phone 400 owned by the user; a server 500 which provides map distribution services; or the like. It is also possible to obtain map information directly from these apparatuses without the Internet 200.

The observed line of sight predicting unit 102 predicts an observed line of sight of the user who observes the outside world based on the status information obtained by the status information obtaining unit 101. For example, when the status information obtaining unit 101 obtains the route information, the observed line of sight predicting unit 102 predicts an observed line of sight according to the route. The route information is information regarding a route of the user. More specifically, it is information of the current position of the user which is obtained by the GPS, map information, information of an activity schedule set in advance (destinations), or the like.

Figure 4:
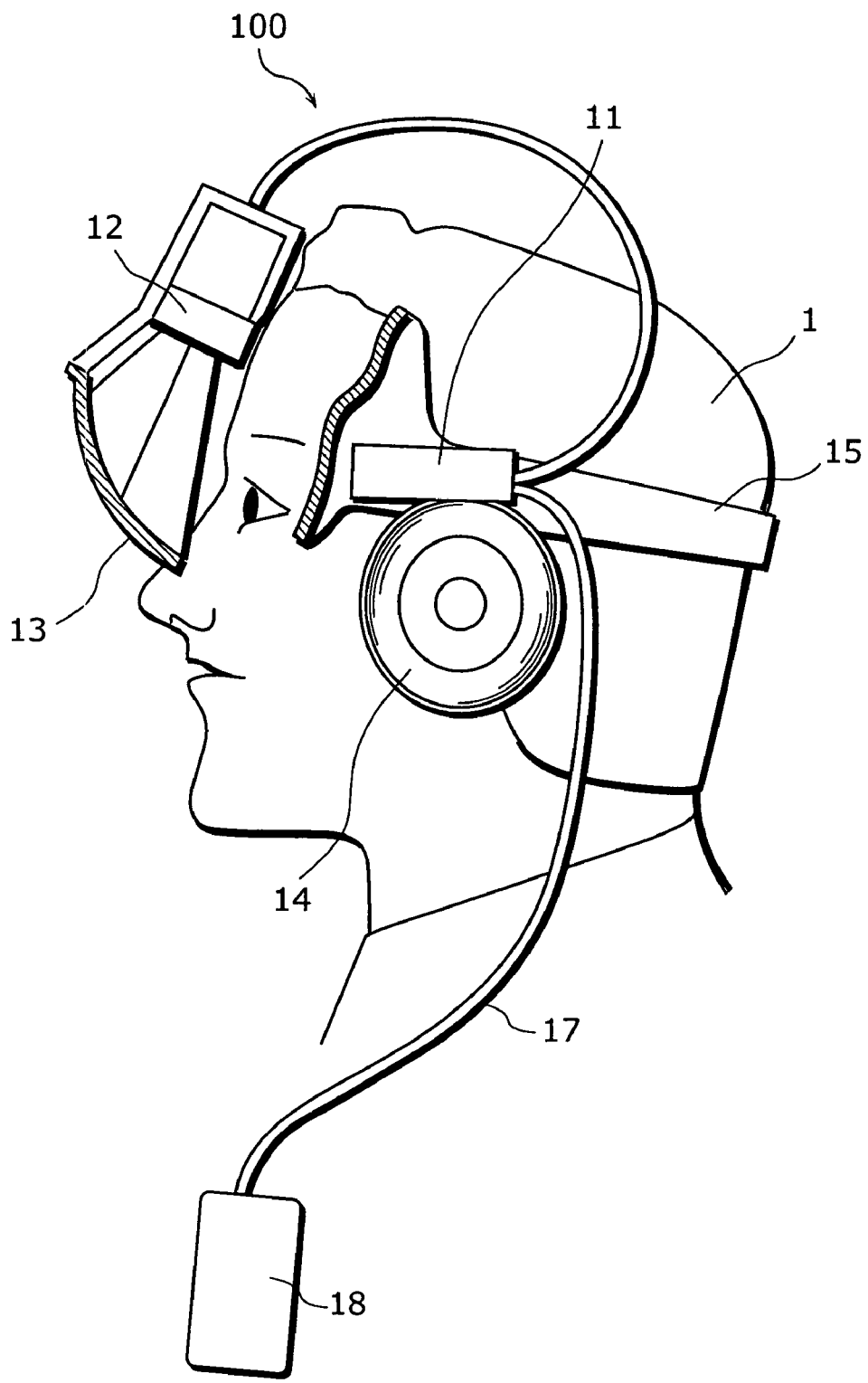
FIG. 4 is a diagram showing the state where the user fits the HMD according to the present invention.

The presented information obtaining unit 103 is a communication interface and the like which obtains information to be presented to the user. The presented information is text, such as an electronic mail, and video, such as a television program. Such presented information can be received by the receiver 16 shown in FIG. 1, via the Internet or the like. Alternatively, as shown in FIG. 4, it is possible to adopt the configuration in which the presented information is stored in a storage unit 18 in advance and is transmitted from the storage unit 18 to a calculator 11 via a cable 17. The storage unit 18 may be, for example, a personal computer, and may be connected to a Local Area Network (LAN), the Internet, or the like.

The recognized line of sight predicting unit 104 predicts a recognized line of sight of the user who recognizes the presented information obtained by the presented information obtaining unit 103. For example, the number of characters which are recognized by the user on a predetermined time basis (for example, per one second) is determined based on an attribute of the presented information or an attribute of the HMD 100. Based on this number, the recognized line of sight of the user who recognizes the presented information is predicted.

The presentation method determining unit 105 determines a method for presenting the presented information obtained by the presented information obtaining unit 103 based on the observed line of sight predicted by the observed line of sight predicting unit 102 and the recognized line of sight predicted by the recognized line of sight predicting unit 104. More specifically, the method for presenting the presented information is determined so that the difference between an observed line of sight and a recognized line of sight falls within a predetermined range.

The information presenting unit 106 presents the presented information obtained by the presented information obtaining unit 103 to the user in the presenting method determined by the presentation method determining unit 105. The specific presentation mode is to be described hereinafter in details with reference to the diagram.

The observed line of sight prediction reference storage unit 107 stores information indicating a reference to be referred to when an observed line of sight is predicted. The observed line of sight prediction reference storage unit 108 stores information indicating a reference to be referred to when a recognized line of sight is predicted. The presentation method storage unit 109 stores information indicating a method for presenting information. The specific examples of the information respectively stored in these storage units are to be described hereinafter.

Figure 5:
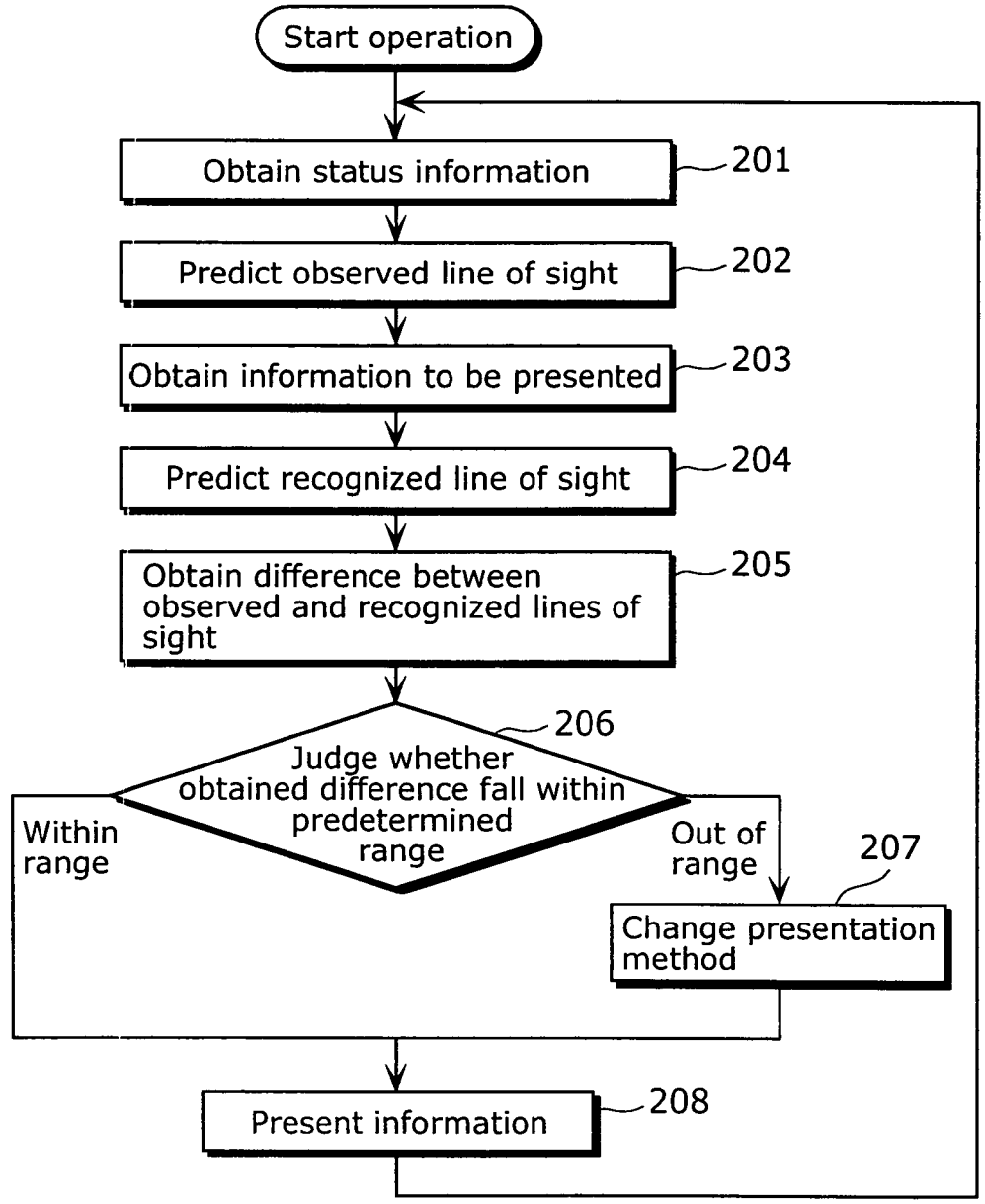
FIG. 5 is a flowchart showing the operation of the HMD according to the present invention.

The following describes the operations of the HMD 100 using FIG. 5.

Figure 6:
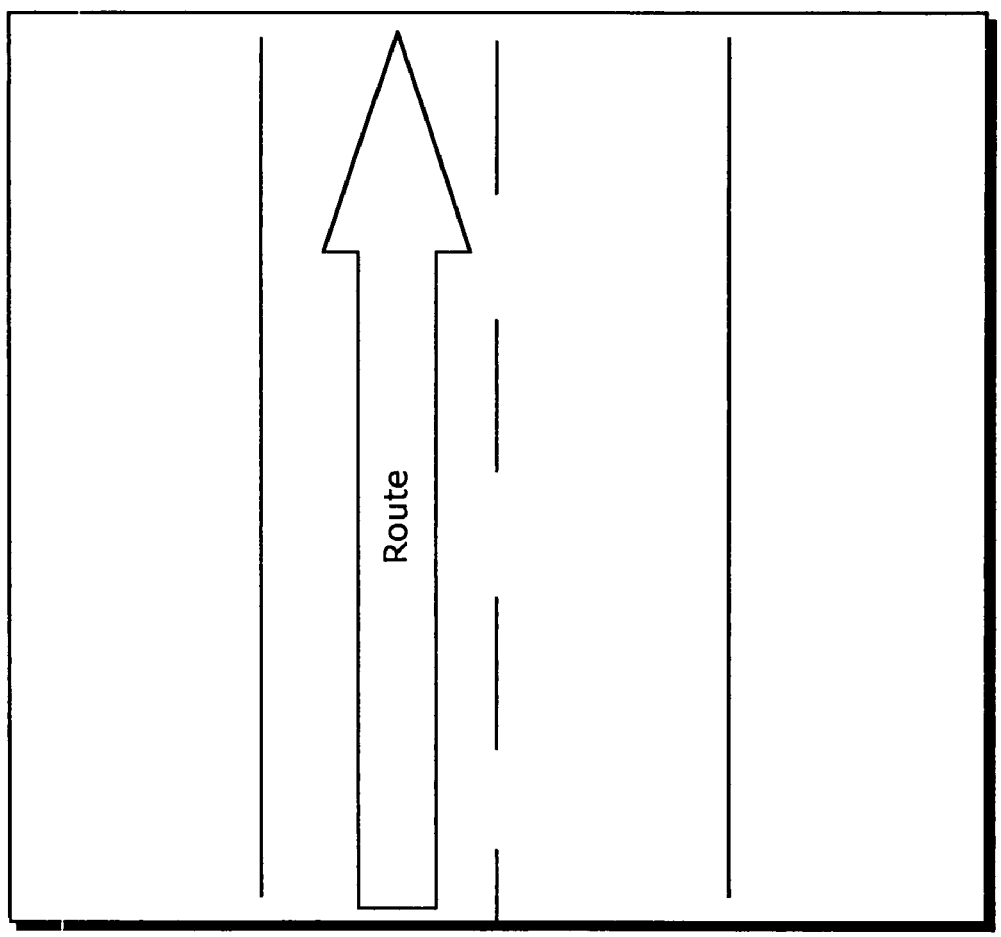
FIG. 6 is a diagram showing a walking route of the user.
Figure 7:
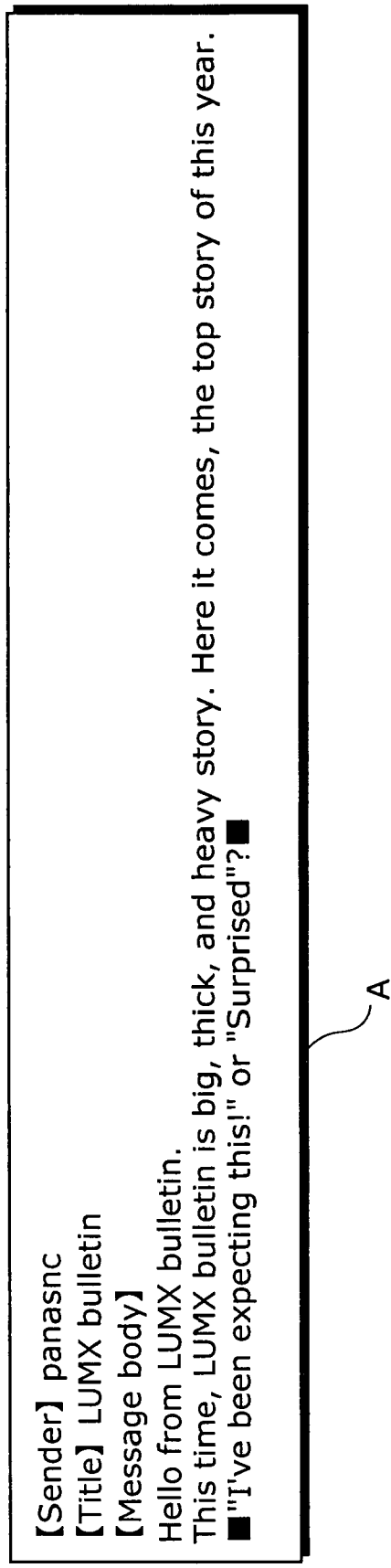
FIG. 7 is a diagram showing the description of an electronic mail.

Here, it is assumed that the user fits the HMD 100 and walks straight along a straight street in which there is no intersection as shown in FIG. 6. While walking the street, it is assumed that the user receives an electronic mail A including "sender", "title", and "message body" as shown in FIG. 7.

With the conventional HMD, as shown in FIG. 8, the street along which the user walks is visible from the front of the user to the depth, and the description of the received electronic mail A is presented in overlap with the image of the street in front of the user. With such a presentation method, the user's line of sight is concentrated downward at the screen, and the user can not view information at ease. Thus, the following technique is applied in the HMD 100 according to the present invention.

First, the status information obtaining unit 101 obtains, as status information, a status of the user during walking (S201). The status information is, for example, route information. As described above, the current position of the user can be obtained by the GPS, and the route information can be calculated based on the destination set on the map in advance. Even when the destination is not set on the map in advance, in the case where there is an activity history indicating that the user has walked in the past, it is possible to predict the route information using such history.

As described, when the status information obtaining unit 101 obtains status information, the observed line of sight predicting unit 102 refers to reference information stored in the observed line of sight prediction reference storage unit 107, and predicts the user's observed line of sight.

FIG. 9A is a diagram showing an example of the reference information stored in the observed line of sight prediction reference storage unit 107. Here, the status of the user and the reference in predicting the observed line of sight are associated with each other. More specifically, "uniform motion" as a status of the user and "uniform motion" as an observed line of sight are associated with each other. Furthermore, "going straight through an intersection" as a status of the user and "looking right and left" as an observed line of sight are associated with each other.

Figure 10:
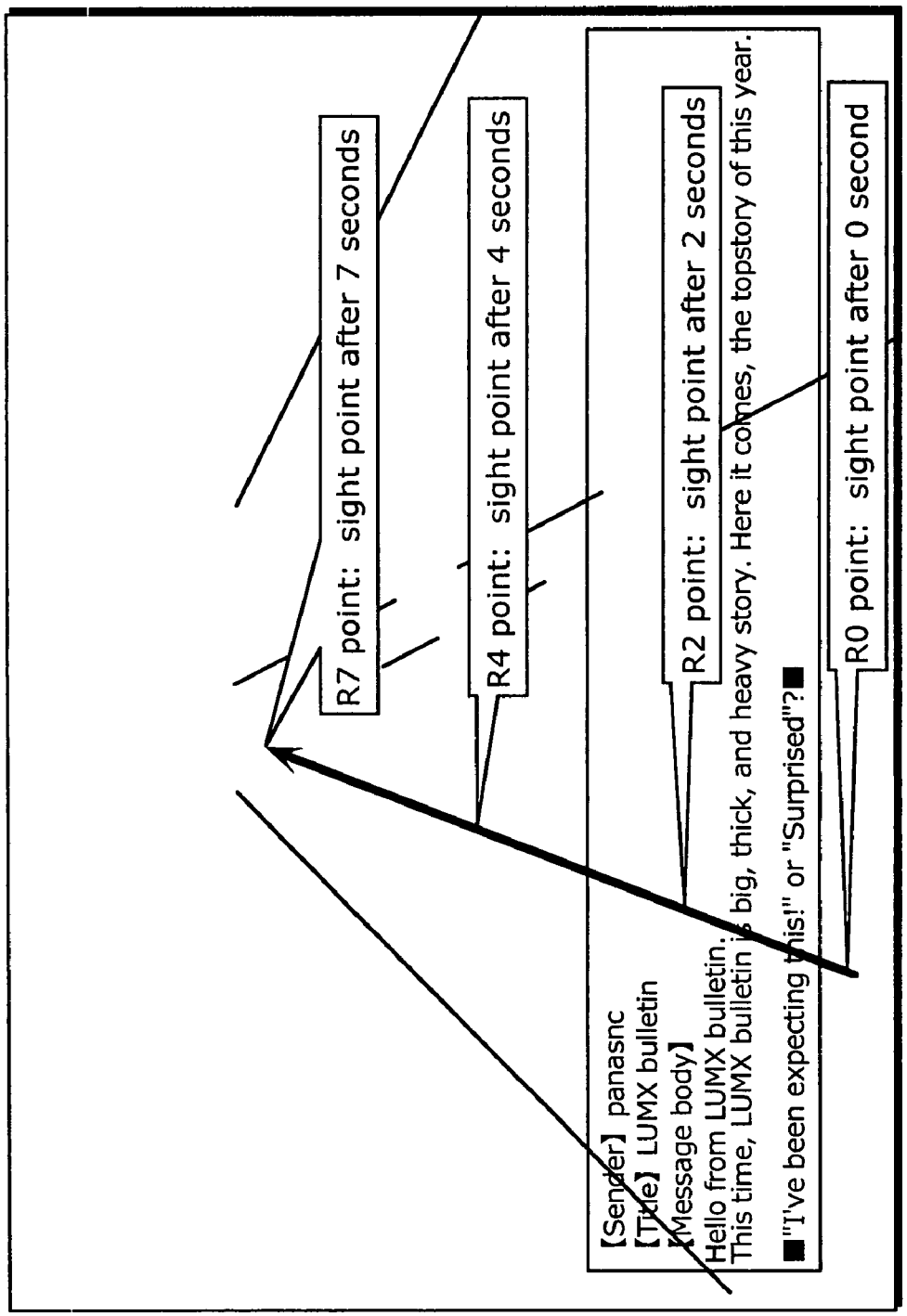
FIG. 10 is a diagram showing a method for predicting an observed line of sight.

Thus, since the user goes straight along a straight street, the observed line of sight predicting unit 102 predicts that the user's observed line of sight moves from the front of the user to the depth on the street according to the walk (S202). More specifically, as shown in FIG. 10, it is predicted that the sight point after 0 second is an R0 point, the sight point after 2 seconds is an R2 point, the sight point after 4 seconds is an R4 point, and the sight point after 7 seconds is an R7 point.

On the other hand, when receiving an electronic mail (S203), the presented information obtaining unit 103 manages it as presented information. As such, when the presented information is under the management of the presented information obtaining unit 103, the recognized line of sight predicting unit 104 refers to the reference information stored in the recognized line of sight prediction reference storage unit 108, and predicts the recognized line of sight of the user who recognizes the electronic mail (S204).

FIG. 11A is a diagram showing an example of the reference information stored in the recognized line of sight prediction reference storage unit 108. Here, depending on the types of presented information, each of the reference for predicting a recognized line of sight is associated with each other. More specifically, "electronic mail" as presented information and "five characters per second" as the recognition speed are associated with each other. Furthermore, "television program" as presented information and "a scene per second" as the recognition speed are associated with each other.

Figure 12:
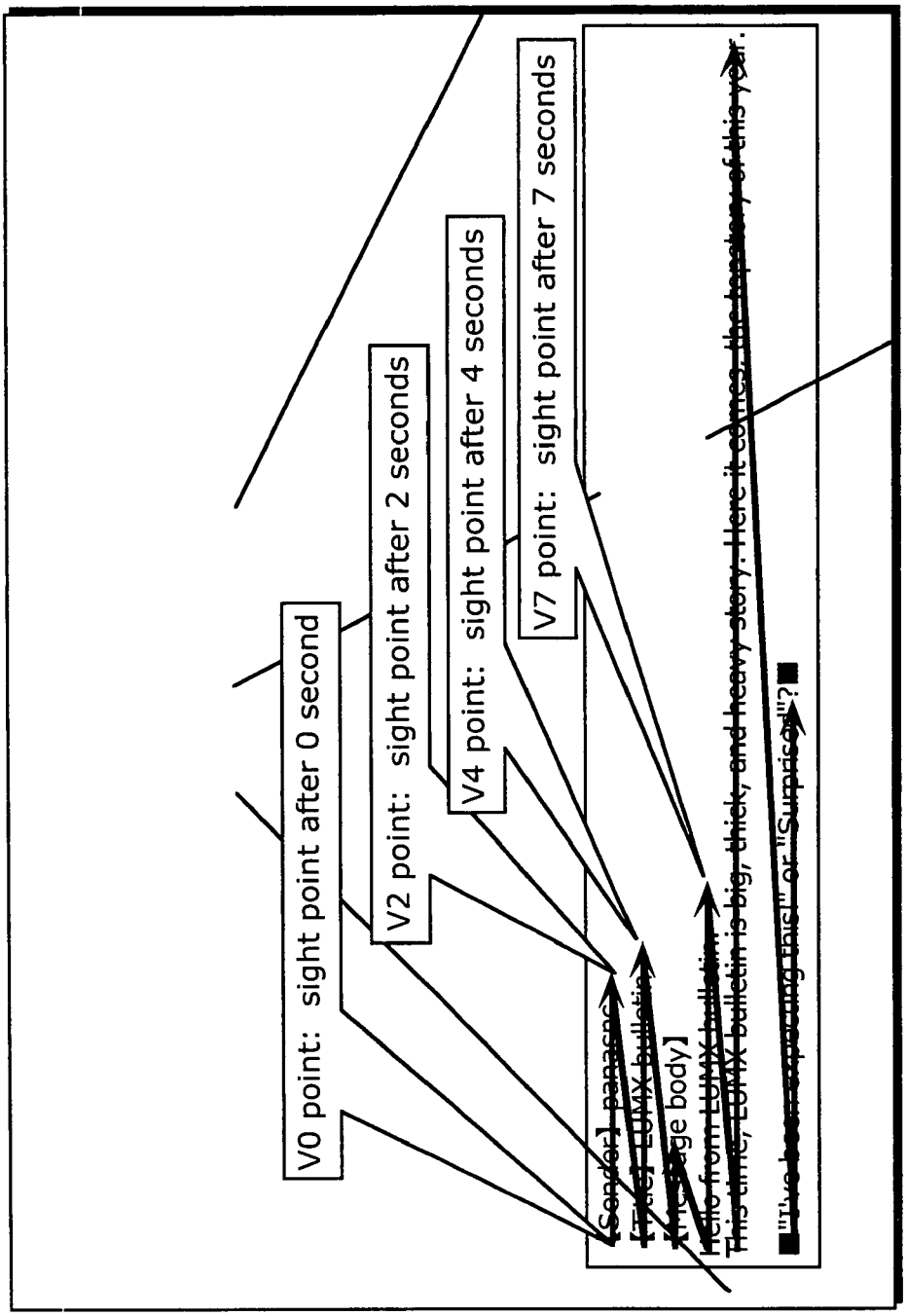
FIG. 12 is a diagram showing a method for predicting a recognized line of sight.

FIG. 12 is a diagram showing the movement of the sight points of the user who recognizes an electronic mail. Since the electronic mail is horizontally presented, it is possible to predict that the sight points of the user who recognizes this electronic mail move from the left side to the right side in an order from the first line. Here, it is predicted that the sight point after 0 second is a V0 point, the sight point after 2 seconds is a V2 point, the sight point after 4 seconds is a V4 point, and the sight point after 7 seconds is a V7 point. In other words, assuming that the speed to read characters is constant (5 characters per second herein), a character to be read at a certain point in the future is identified, and the location at which the character is presented is predicted as a sight point.

Figure 13:
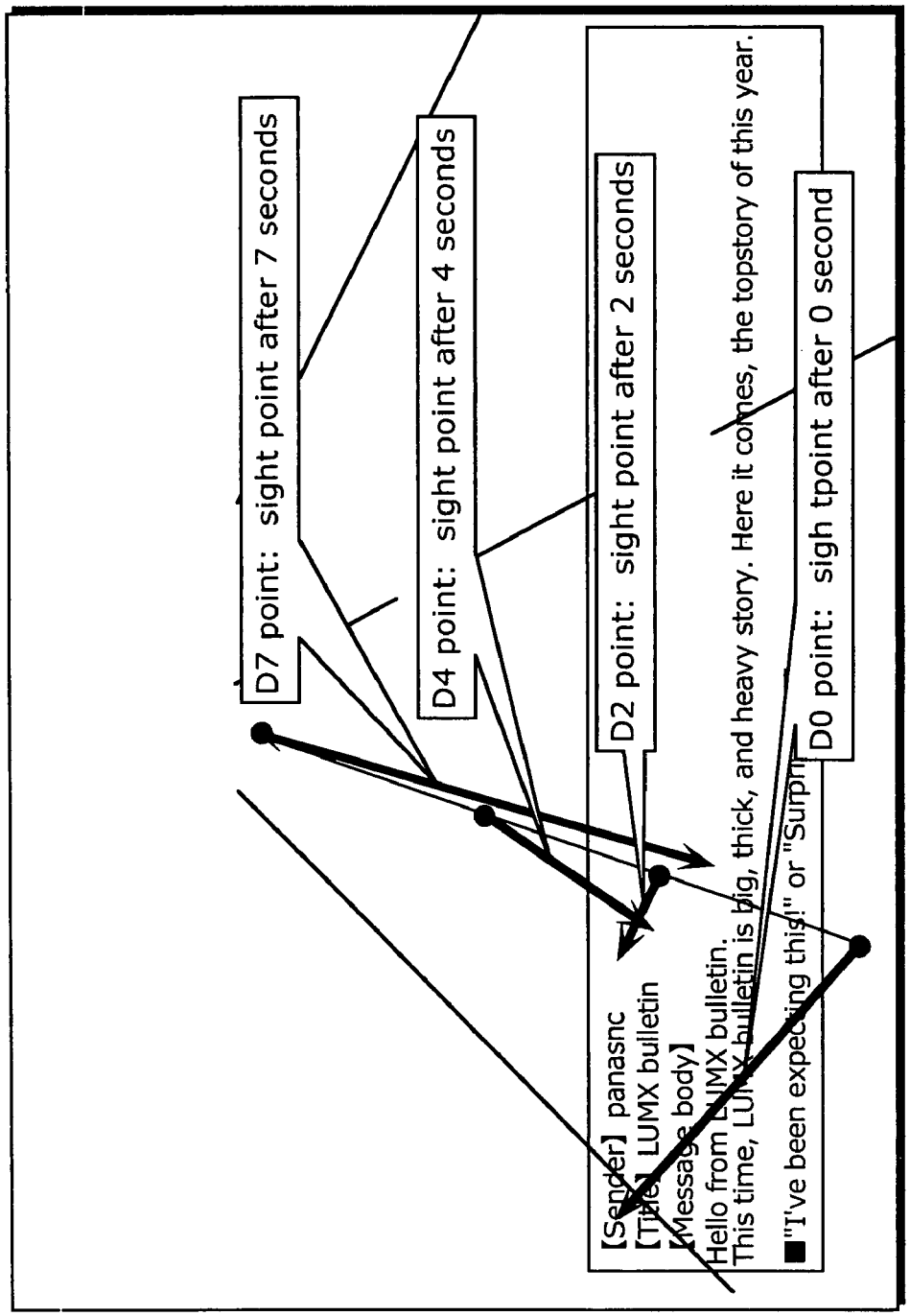
FIG. 13 is a diagram showing a difference between an observed line of sight and a recognized line of sight.

Thus, when the observed line of sight and the recognized line of sight are predicted, the presentation method determining unit 105 finds the difference between the aforementioned lines of sight. In other words, as shown in FIG. 13, the difference between the lines-of sight after 0 second can be indicated by an arrow D0, the difference after 2 seconds by an arrow D2, the difference after 4 seconds by an arrow D4, and the difference after 7 seconds by an arrow D7.

Figure 14A:
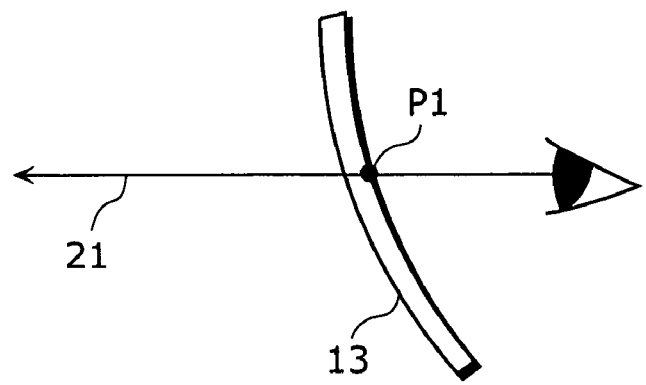
FIGS. 14A, 14B, and 14C are diagrams each showing a difference between an observed line of sight and a recognized line of sight.
Figure 14B:
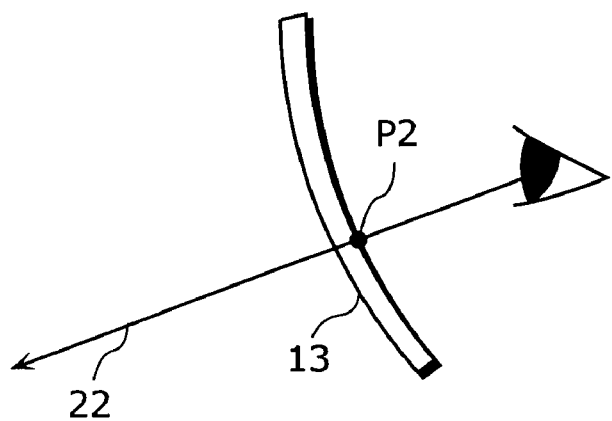
Figure 14C:
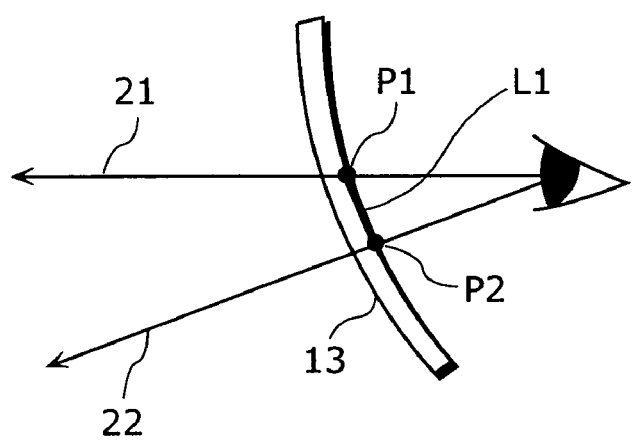

The way to find a difference between a recognized line of sight and an observed line of sight is further described using FIG. 14. First, as shown in FIG. 14, an intersection point P1 of an observed line of sight 21 and an optical element 13 is obtained. Next, an intersection point P2 of a recognized line of sight and an optical element 13 is obtained. Finally, as shown in FIG. 14C, a distance L1 between the intersection points P1 and P2 is obtained. The distance L1 is, for example, the size of the arrow D0.

Next, the presentation method determining unit 105 judges whether or not the obtained difference falls within a predetermined range (S206). For example, it is judged whether or not each size of the arrows D0, D2, D4, and D7 is equal to or less than 2 mm on the optical element 13. When it is judged that each size of the arrows D0, D2, D4, and D7 is equal to or less than 2 mm on the optical element 13, the method for presenting an electronic mail is not changed (S206 to S208). When it is judged that the size of the arrows D0, D2, D4, and D7 is over 2 mm on the optical element 13, the method for presenting an electronic mail is changed (S206 to S207).

FIG. 15 is a diagram showing an example of the presentation method information stored in the presentation method storage unit 109. Here, depending on the types of presented information, each type of the presentation method is associated with each other. More specifically, "electronic mail" as presented information and "projective presentation method" as a presentation method are associated with each other. Furthermore, "television program" as presented information and "part presentation method" as a presentation method are associated with each other. The projective presentation method is a presentation method which projectively places presented information along the route of the user. The part presentation method is a presentation method which places respective parts of presented information in chronological order along the route of the user. Here, since the presented information is an electronic mail, the presentation method determining unit 105 changes the presentation method for an electronic mail from the method shown in FIG. 13 to the projective presentation method.

Figure 16:
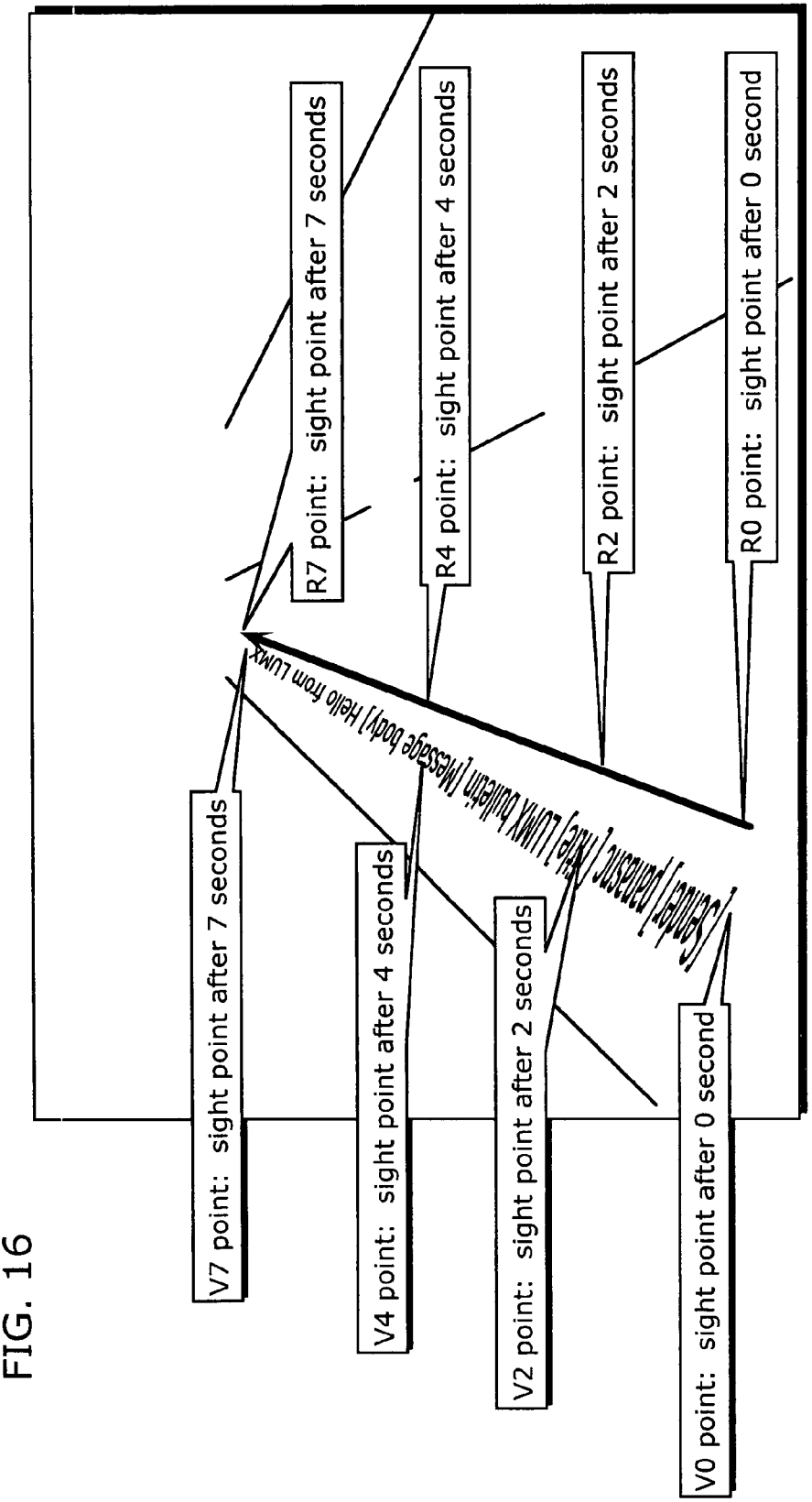
FIG. 16 is a diagram showing an example of a presentation method.

FIG. 16 is a diagram showing a variation example of a method for presenting an electronic mail. As shown in this diagram, the presentation method determining unit 105 changes the method for presenting an electronic mail so as to make, equal to or less than 2 mm on the optical element 13, each size of the arrows D0, D2, D4, and D7. Compared to the presentation method shown in FIG. 13, it is obvious that the R0 point and V0 point, the R2 point and V2 point, the R4 point and V4 point, and the R7 point and V7 point are respectively close each other in the projective presentation method shown in FIG. 16.

Figure 17:
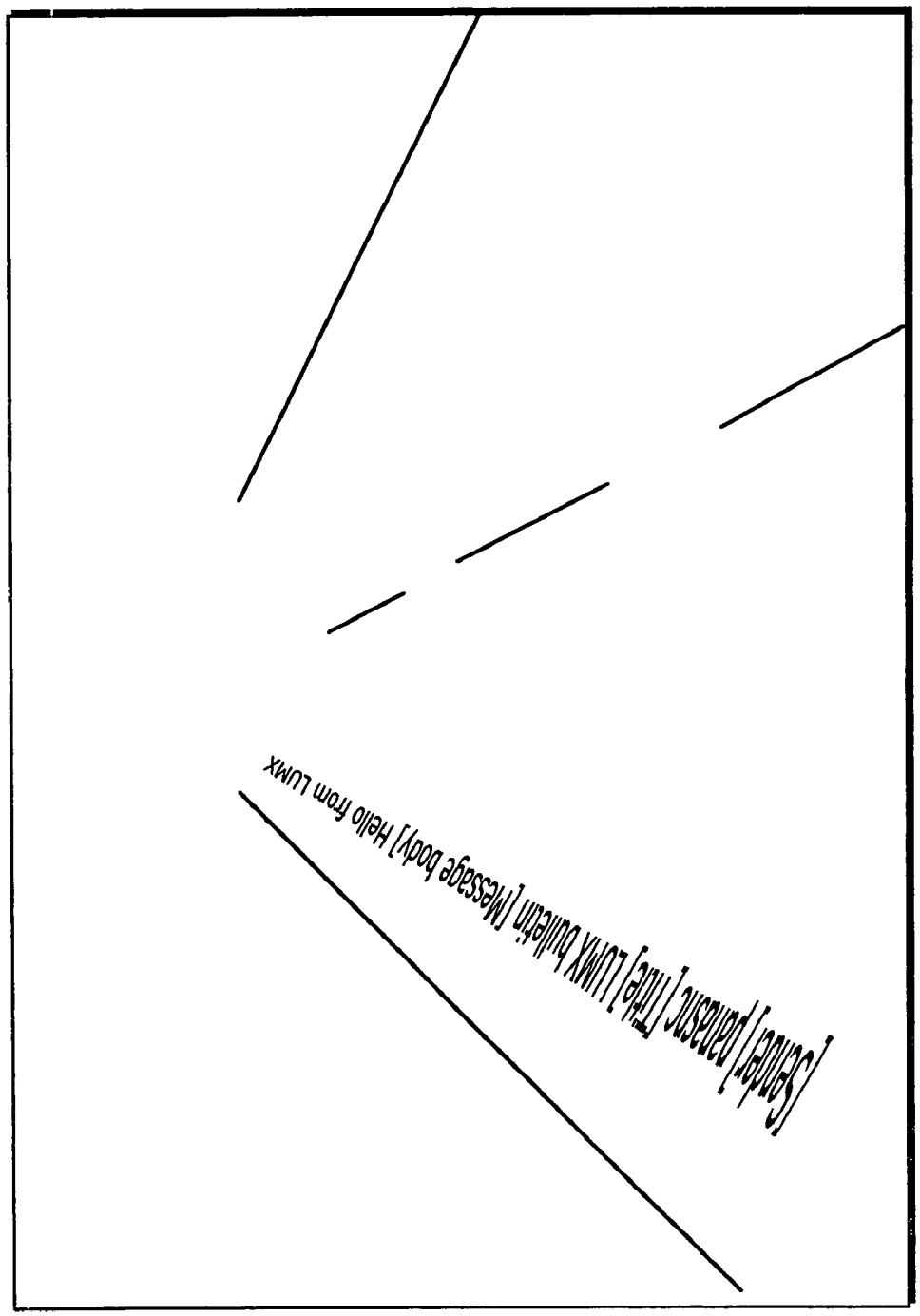
FIG. 17 is a diagram showing a state viewed from the user after 0 second.
Figure 18:
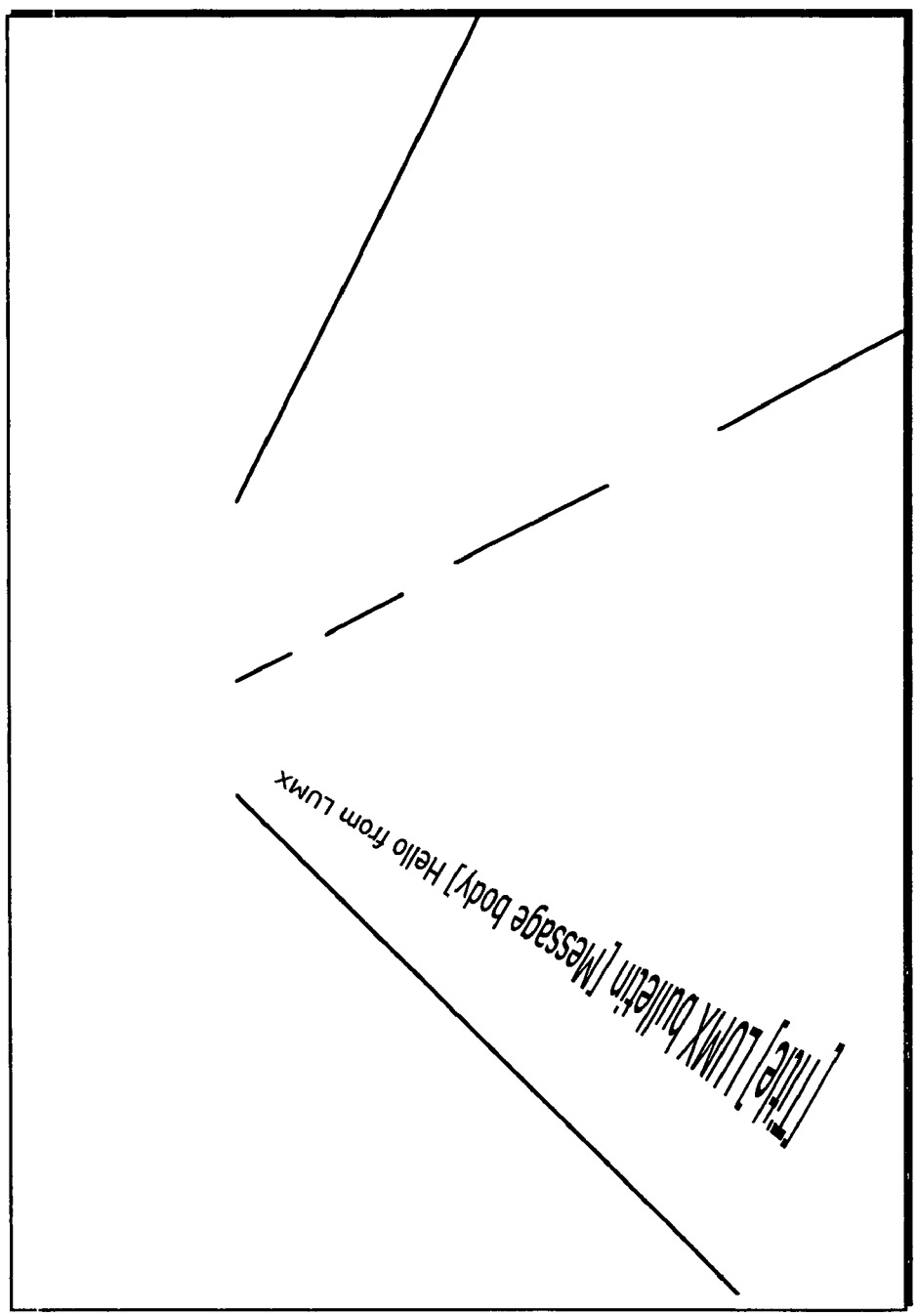
FIG. 18 is a diagram showing a state viewed from the user after 2 seconds.
Figure 19:
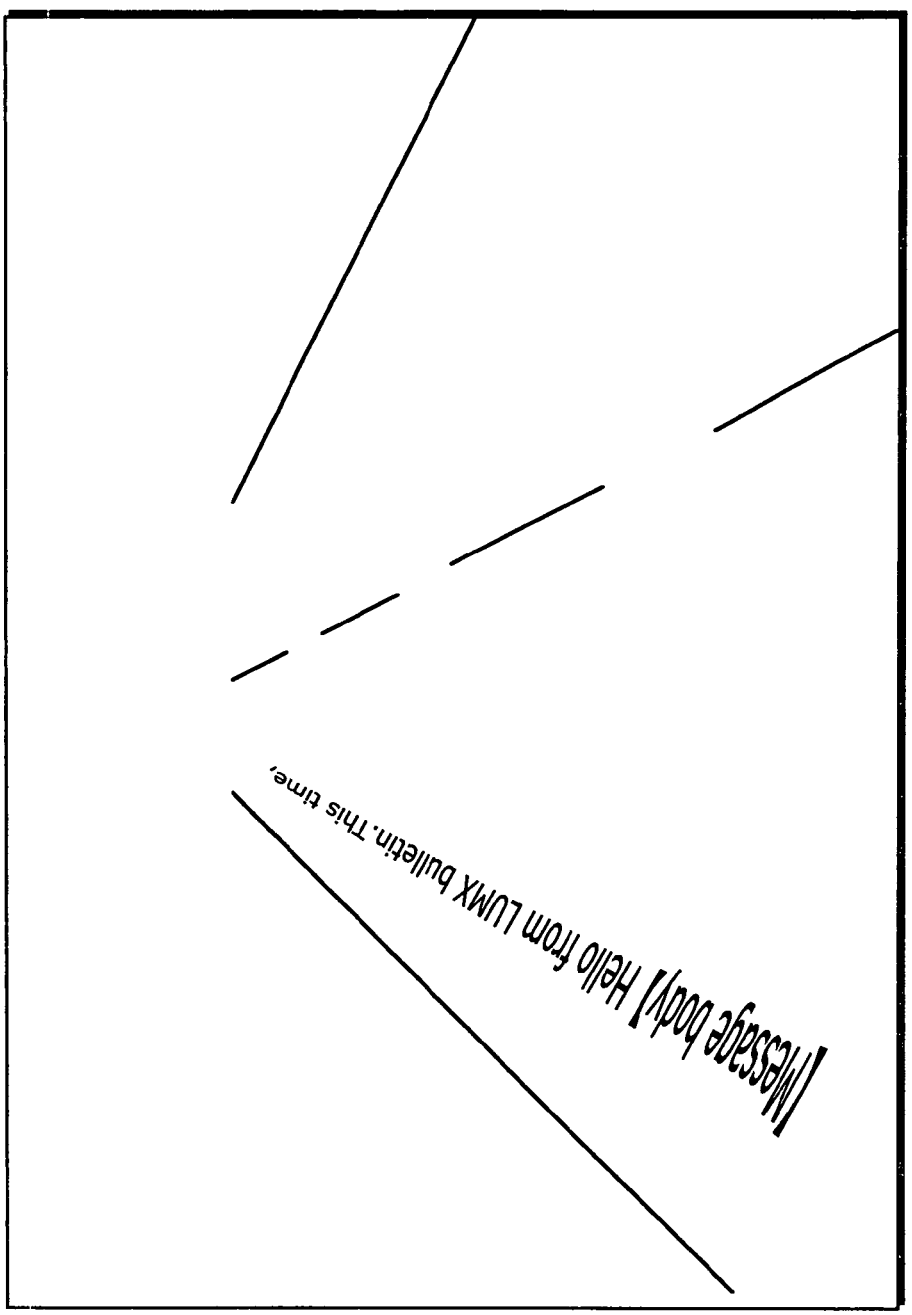
FIG. 19 is a diagram showing a state viewed from the user after 4 seconds.
Figure 20:
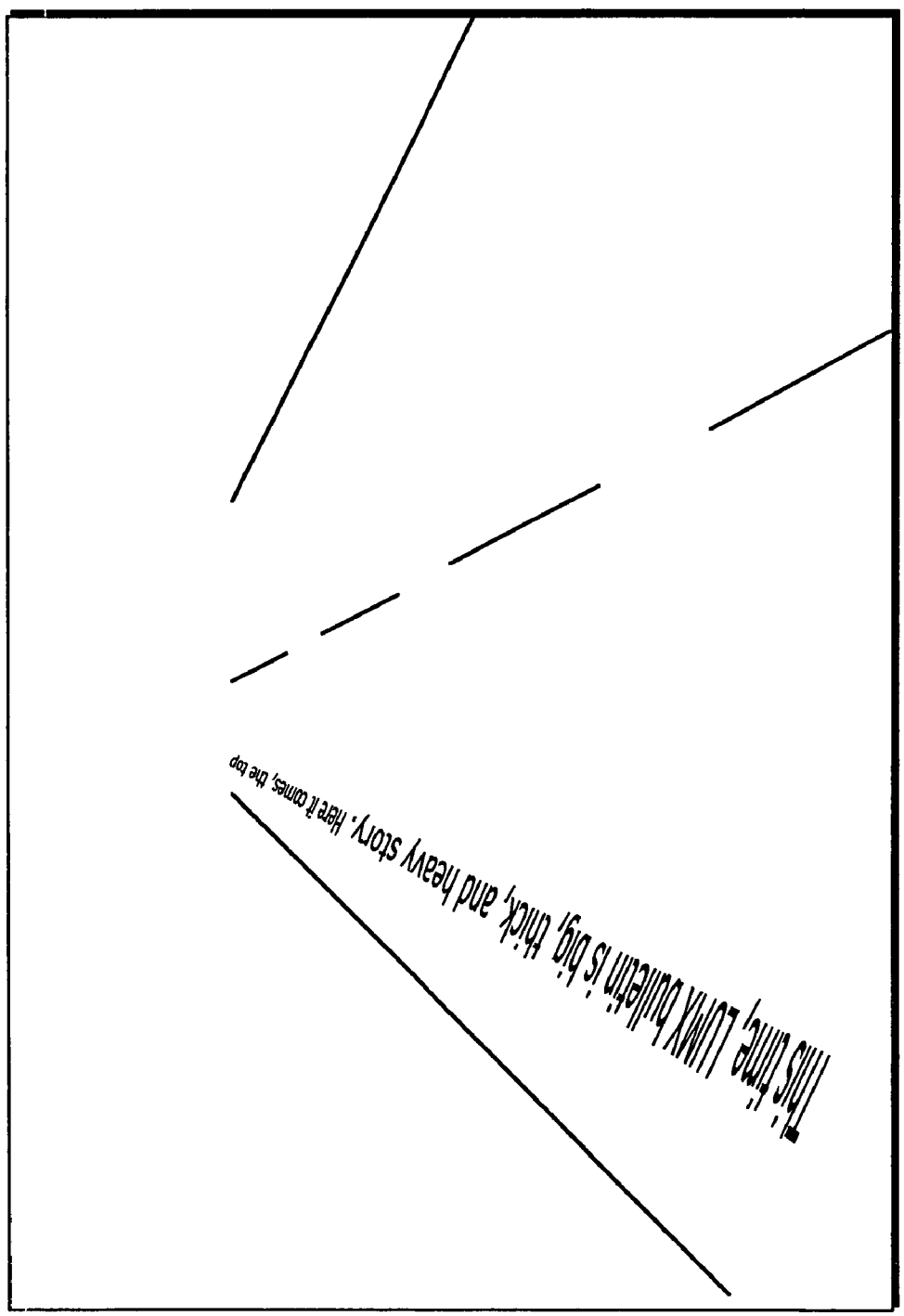
FIG. 20 is a diagram showing a state viewed from the user after 7 seconds.

As such, once the presentation method of an electronic mail is determined, the information presenting unit 106 presents the electronic mail in the projective presentation method (S208). In other words, FIG. 17 shows a state in which the user views after 0 second, and in this state, the characters "sender" are visible in front. FIG. 18 shows a state in which the user views after 2 seconds. In this state, the characters "title" are visible in front. FIG. 19 shows a state in which the user views after 4 seconds. In this state, the characters "message body" are visible in front. FIG. 20 shows a state in which the user views after 7 seconds. In this state, the characters following "message body" are visible in front. As such, with the presentation method, the description of the electronic mail is recognized by the user as if it were written on a street.

As described above, the HMD 100 predicts an observed line of sight based on the status information and predicts a recognized line of sight based on the presented information. Then, the HMD 100 finds intersection points P1 and P2 of the predicted lines of sight and the optical element 13 respectively. When the distance L1 between the P1 and P2 is over 2 mm, the method for presenting an electronic mail is changed so as to make the distance L2 equal to or less than 2 mm.

As clarified in the aforementioned description, with the information presentation device according to the present invention, it is possible to place the presented information so as to allow the user to look to a safe direction. More specifically, the difference between an observed line of sight and a recognized line of sight is obtained, and the method for presenting information is determined so that the difference in the distance becomes short. With this, it becomes possible to reduce the load of the movement of lines of sight, and to allow the user to recognize presented information while the safety of the user is further ensured.

Figure 21:
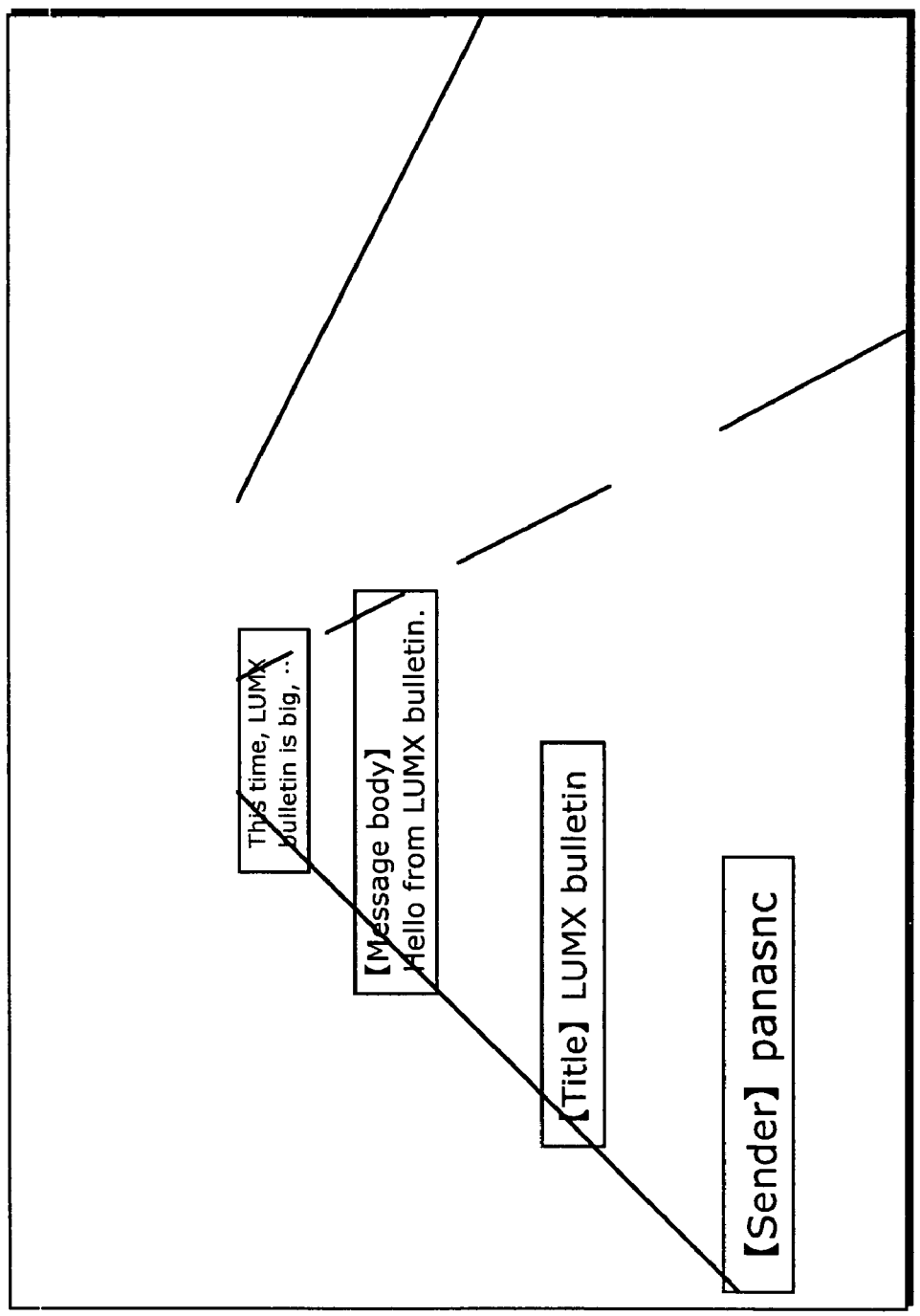
FIG. 21 is a diagram showing a state viewed from the user after 0 second.
Figure 22:
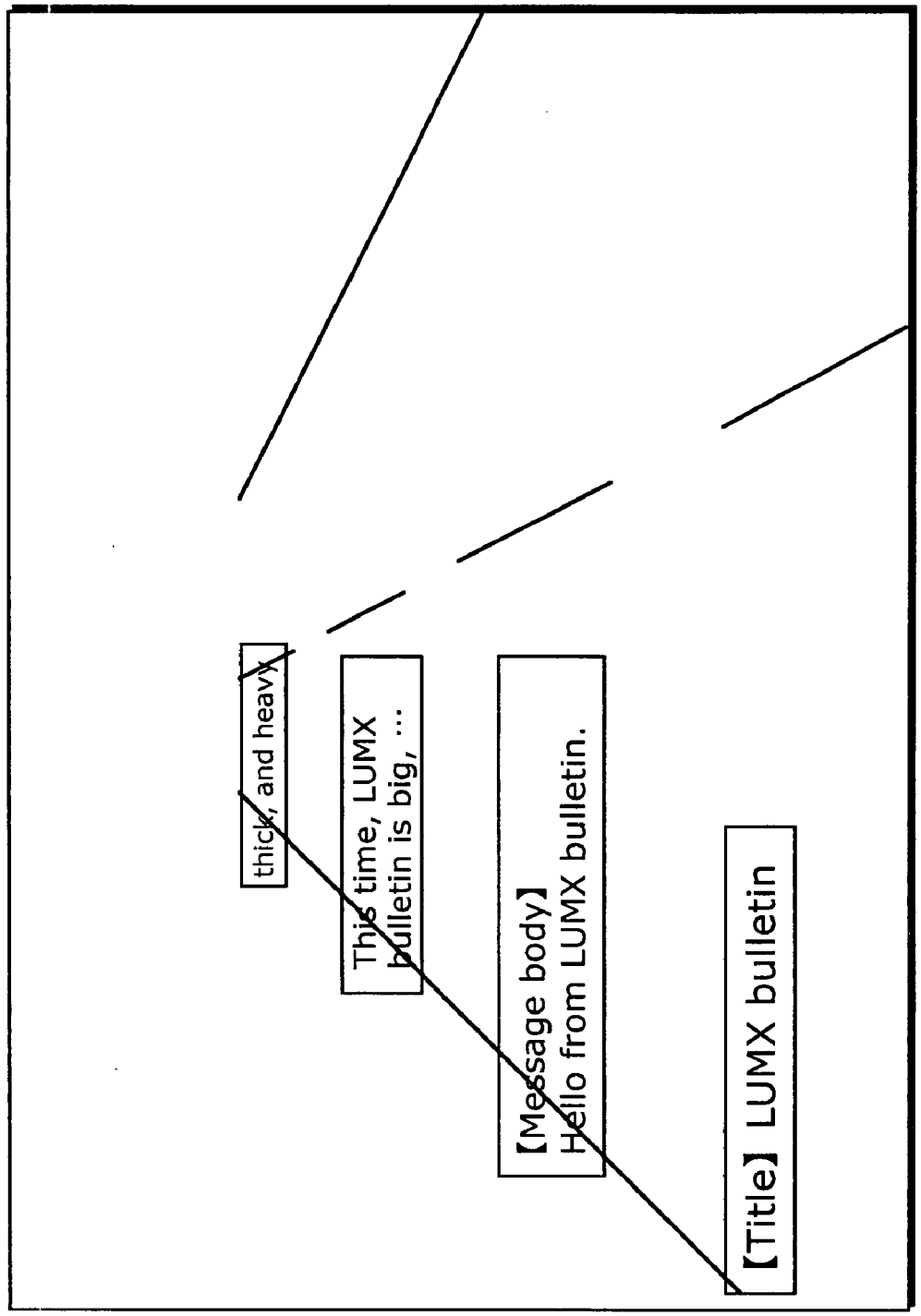
FIG. 22 is a diagram showing a state viewed from the user after 2 seconds.
Figure 23:
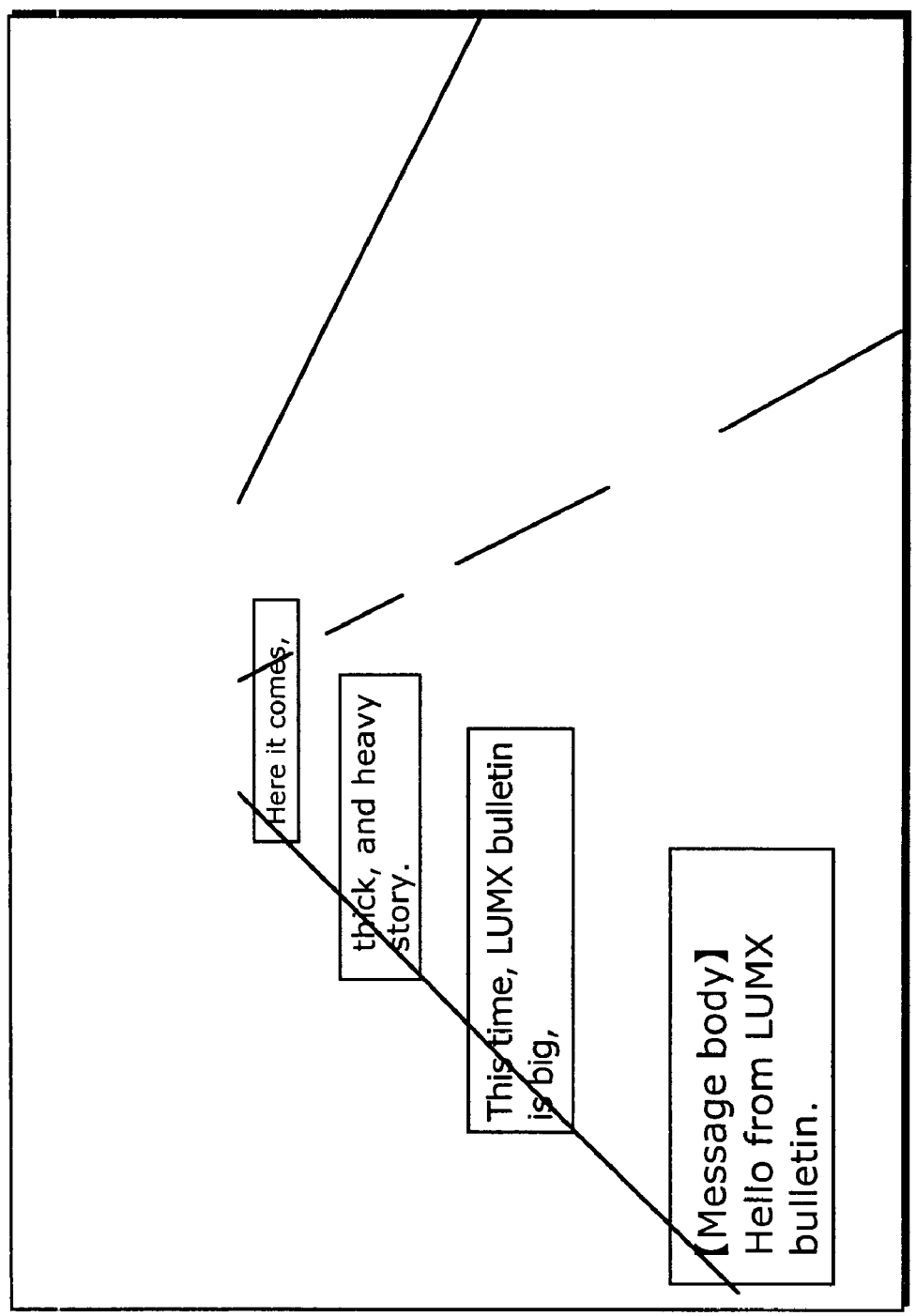
FIG. 23 is a diagram showing a state viewed from the user after 4 seconds.
Figure 24:
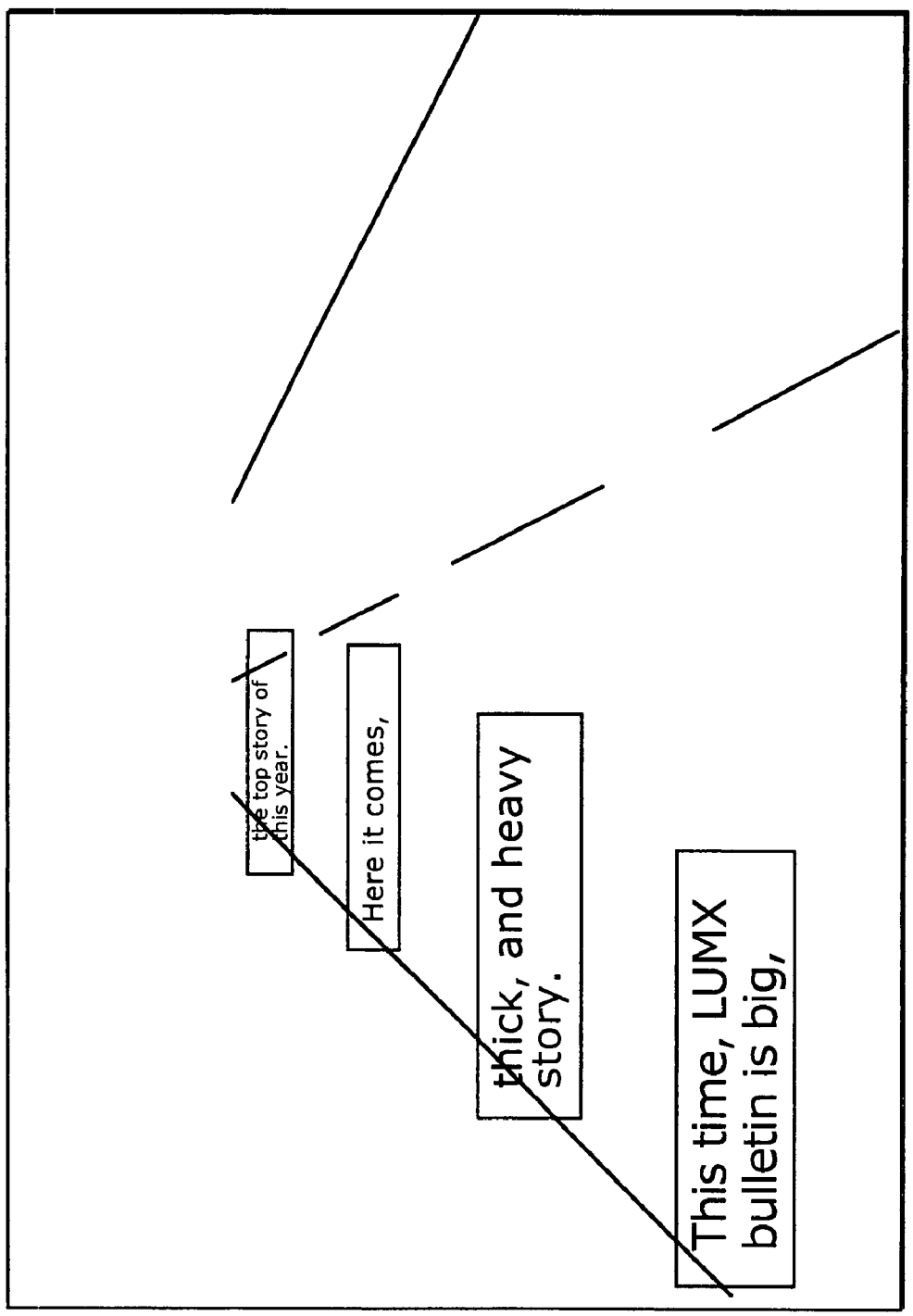
FIG. 24 is a diagram showing a state viewed from the user after 7 seconds.
Figure 25:
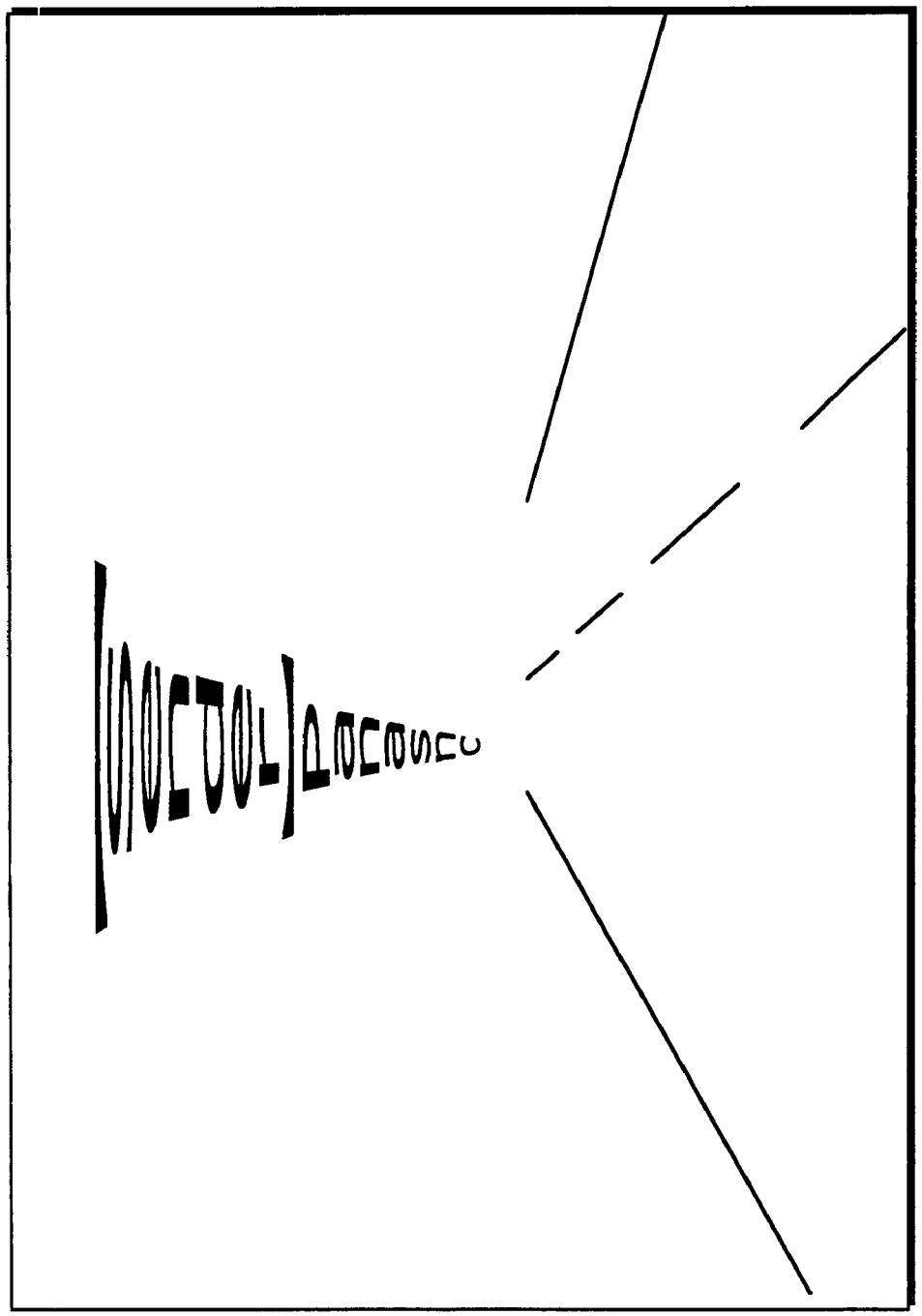
FIG. 25 is a diagram showing a state viewed from the user after 0 second.
Figure 26:
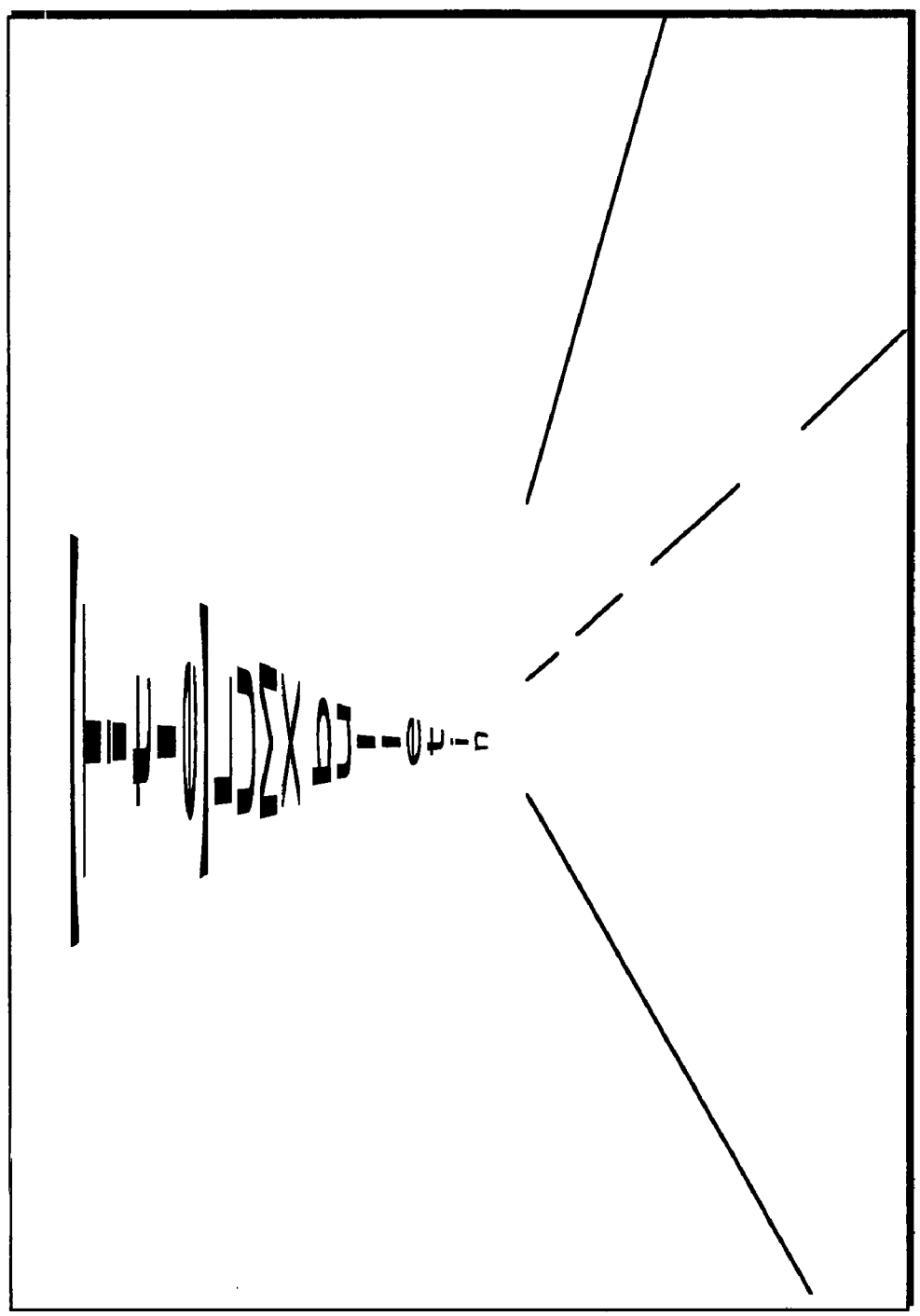
FIG. 26 is a diagram showing a state viewed from the user after 2 seconds.
Figure 27:
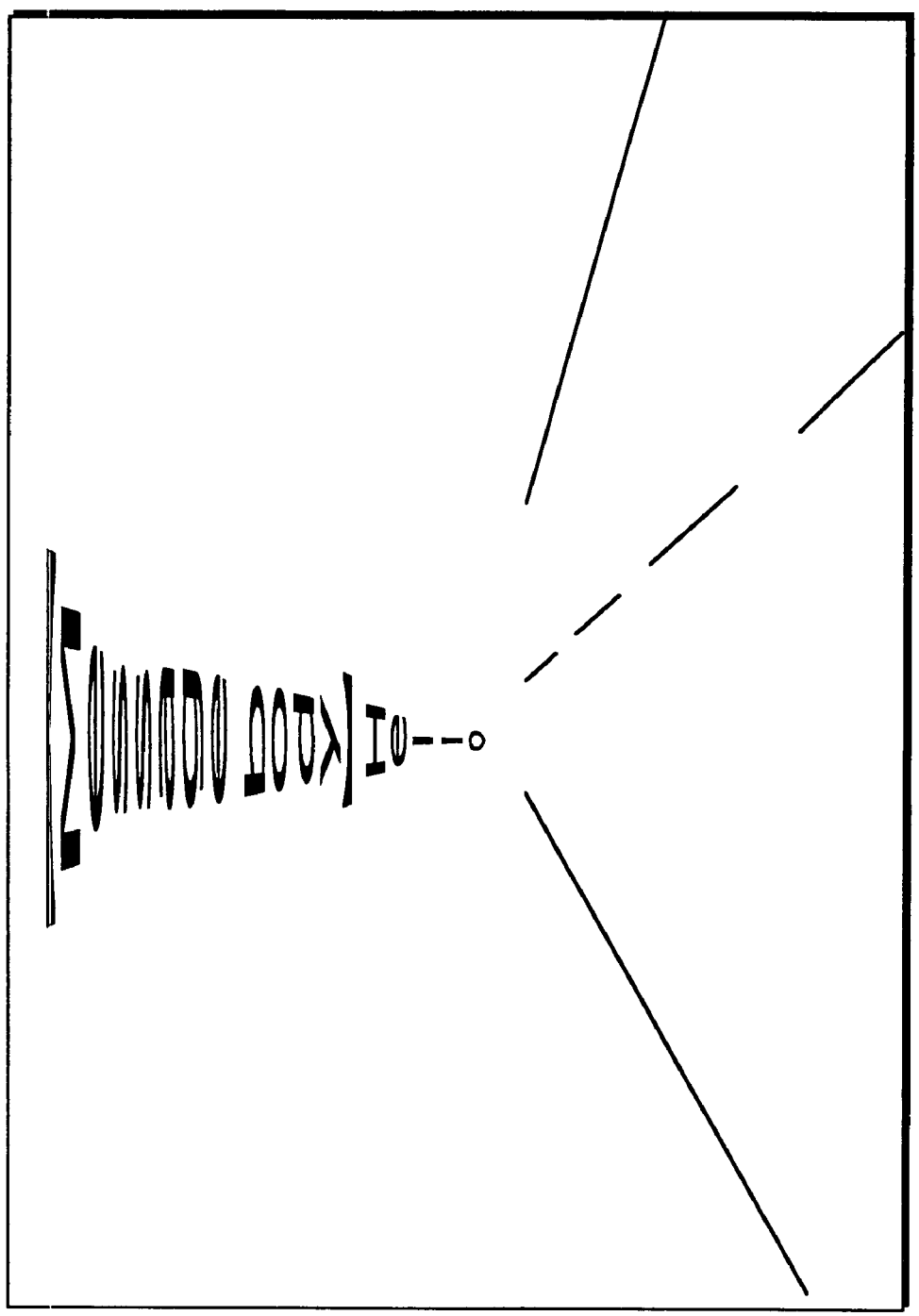
FIG. 27 is a diagram showing a state viewed from the user after 4 seconds.
Figure 28:
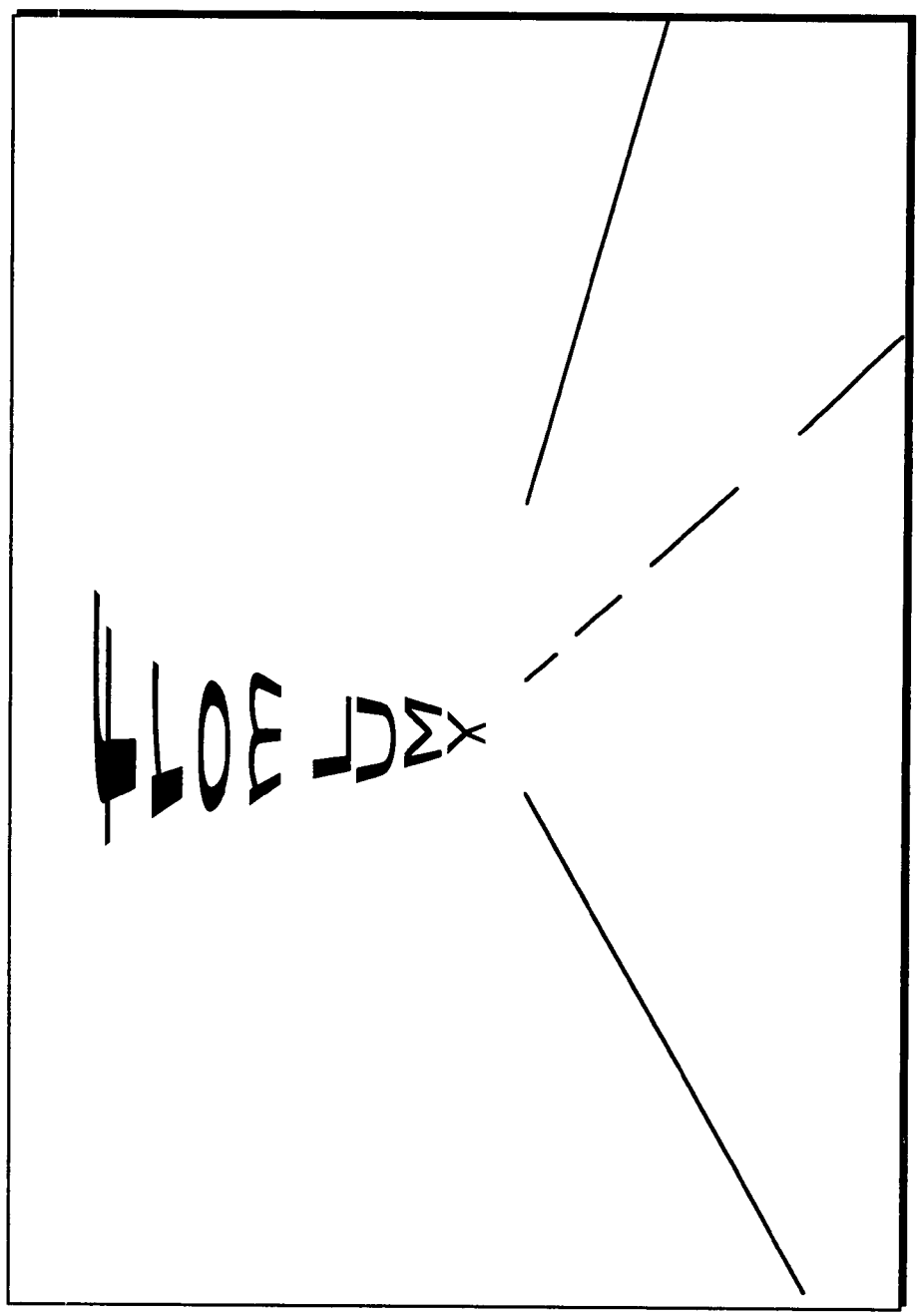
FIG. 28 is a diagram showing a state viewed from the user after 7 seconds.

Note that the presentation method of an electronic mail is not limited to the aforementioned projective presentation method. For example, the description of an electronic mail may be divided into plural parts, and each of the parts may be presented according to the route of the user in chronological order. In other words, as the mere description of the presentation mode, FIG. 21 indicates a state in which the user views after 0 second, FIG. 22 indicates the state after 2 seconds, FIG. 23 indicates the state after 4 seconds, and FIG. 24 indicates the state after 7 seconds. Alternatively, the electronic mail may be vertically presented upward according to the route of the user. In other words, FIG. 25 indicates a state in which the user views after 0 second, FIG. 26 indicates the state after 2 seconds, FIG. 27 indicates the state after 4 seconds, and FIG. 28 indicates the state after 7 seconds.

Figure 29:
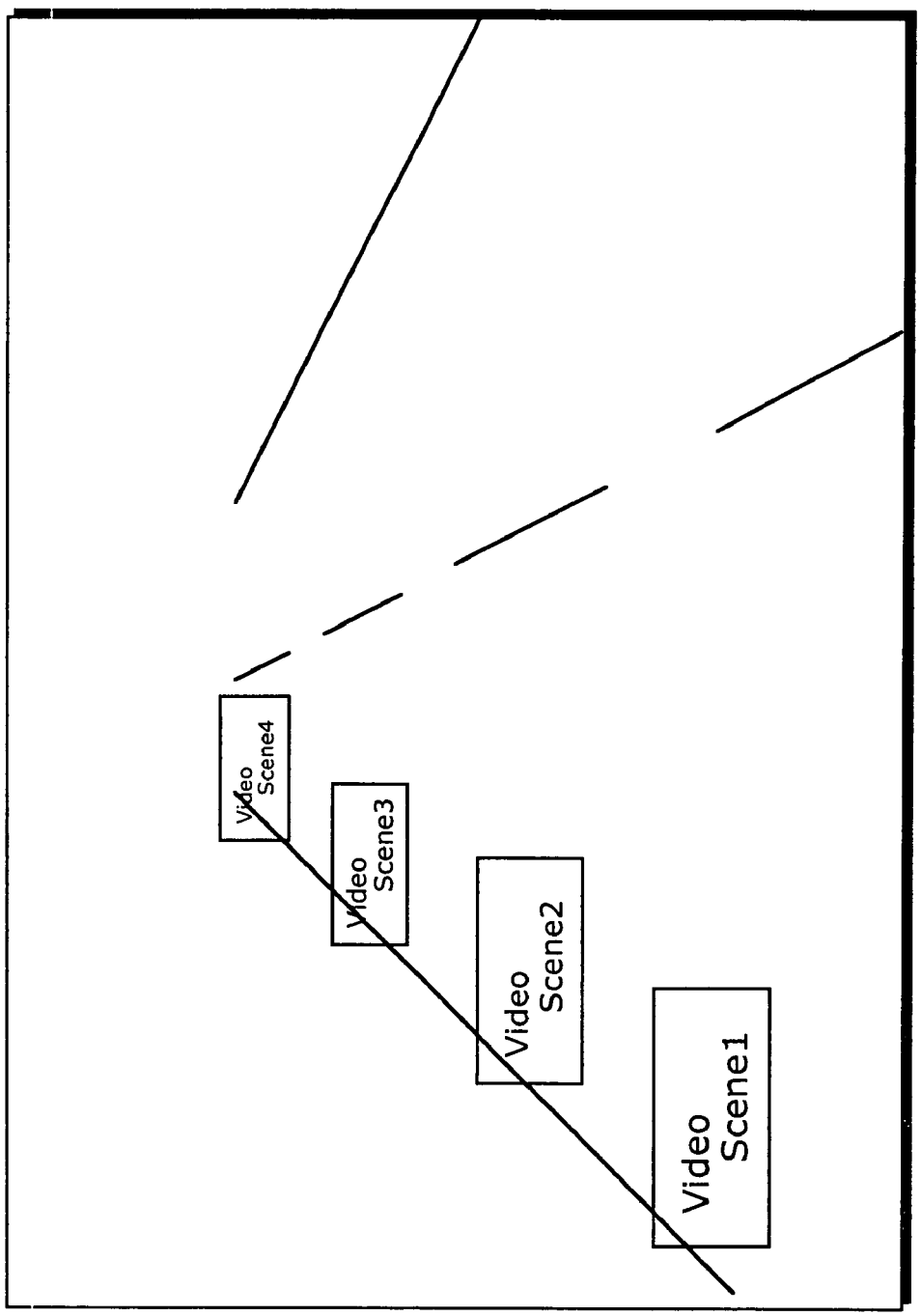
FIG. 29 is a diagram showing a state viewed from the user after 0 second.
Figure 30:
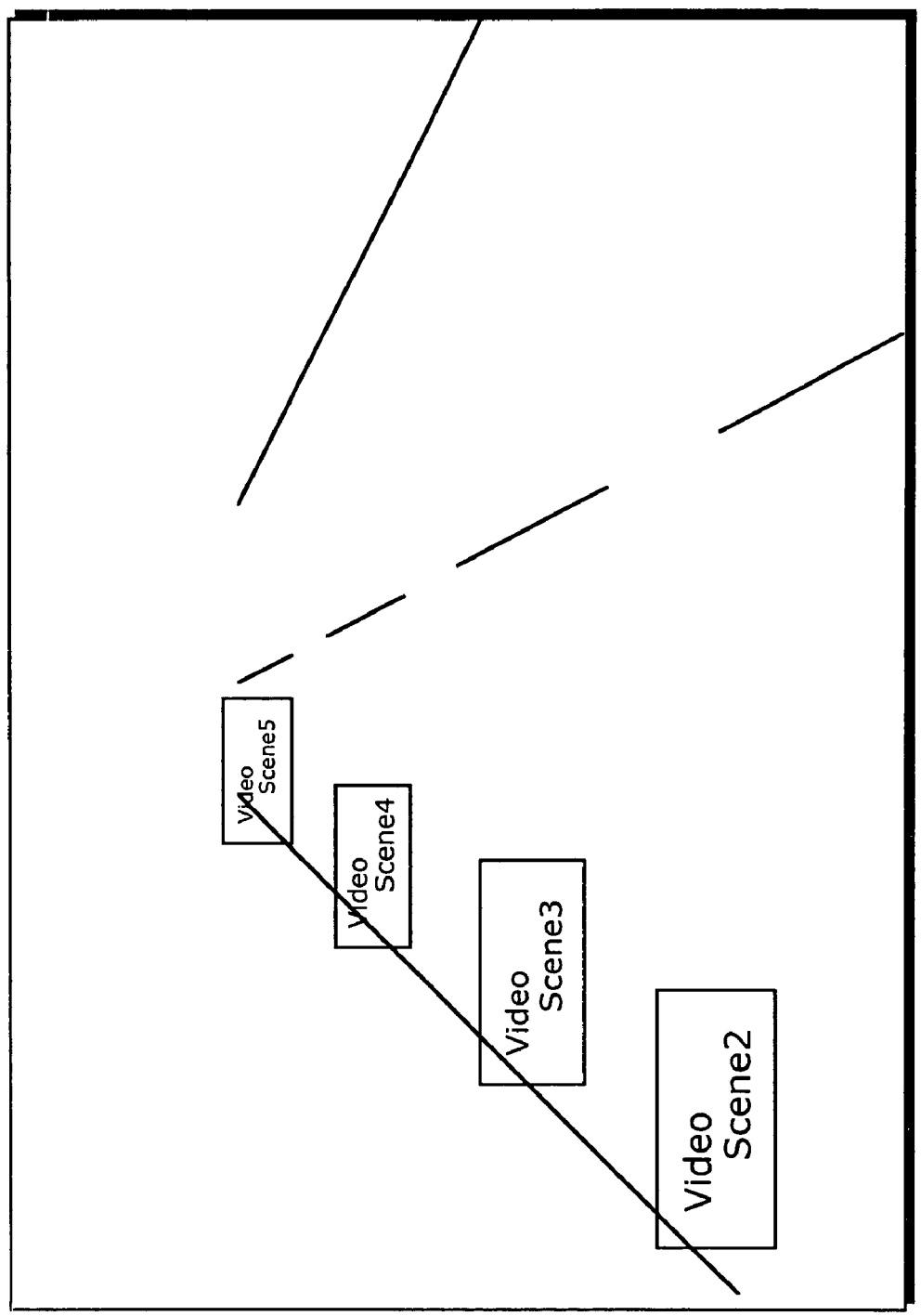
FIG. 30 is a diagram showing a state viewed from the user after 2 seconds.
Figure 31:
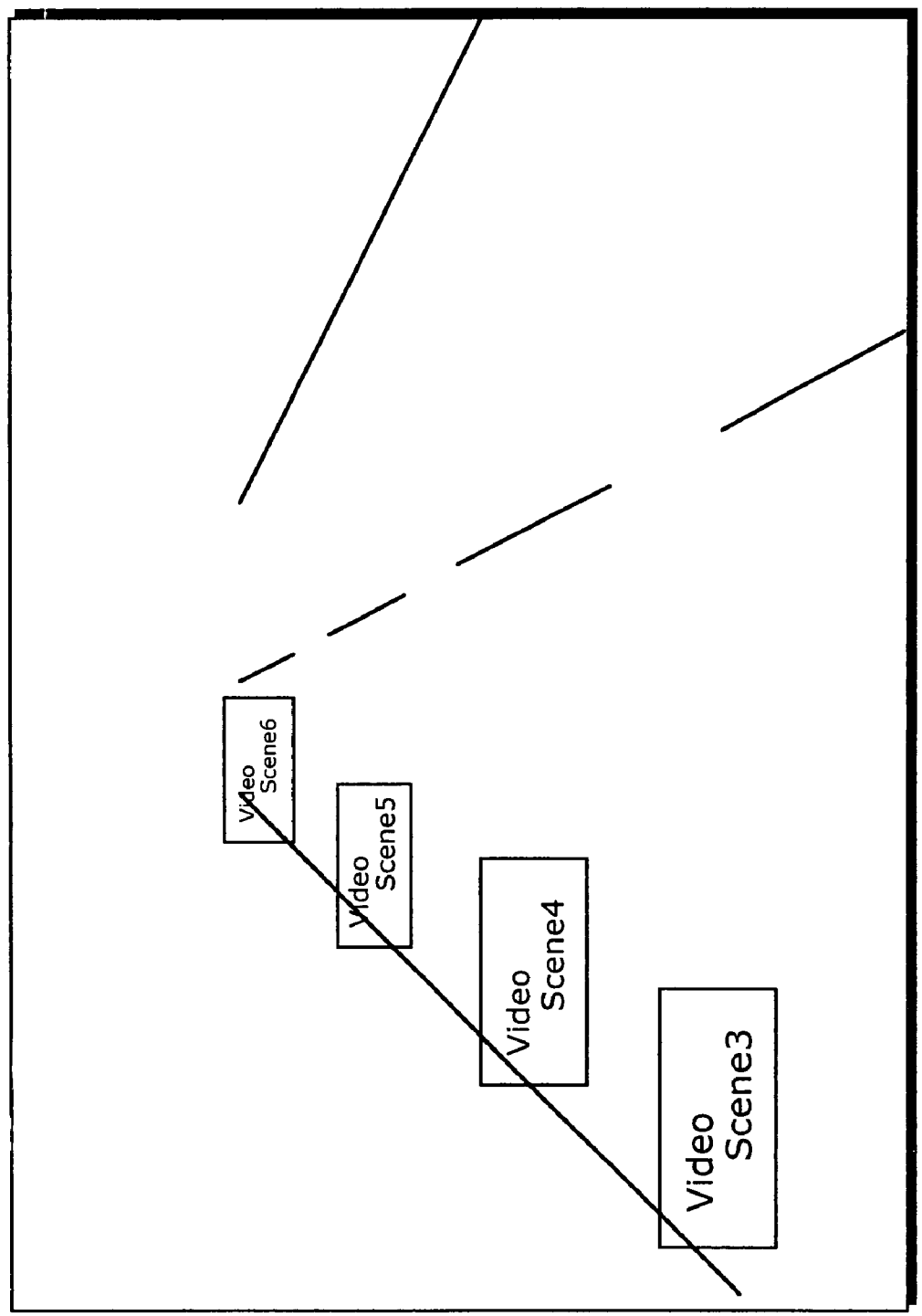
FIG. 31 is a diagram showing a state viewed from the user after 4 seconds.
Figure 32:
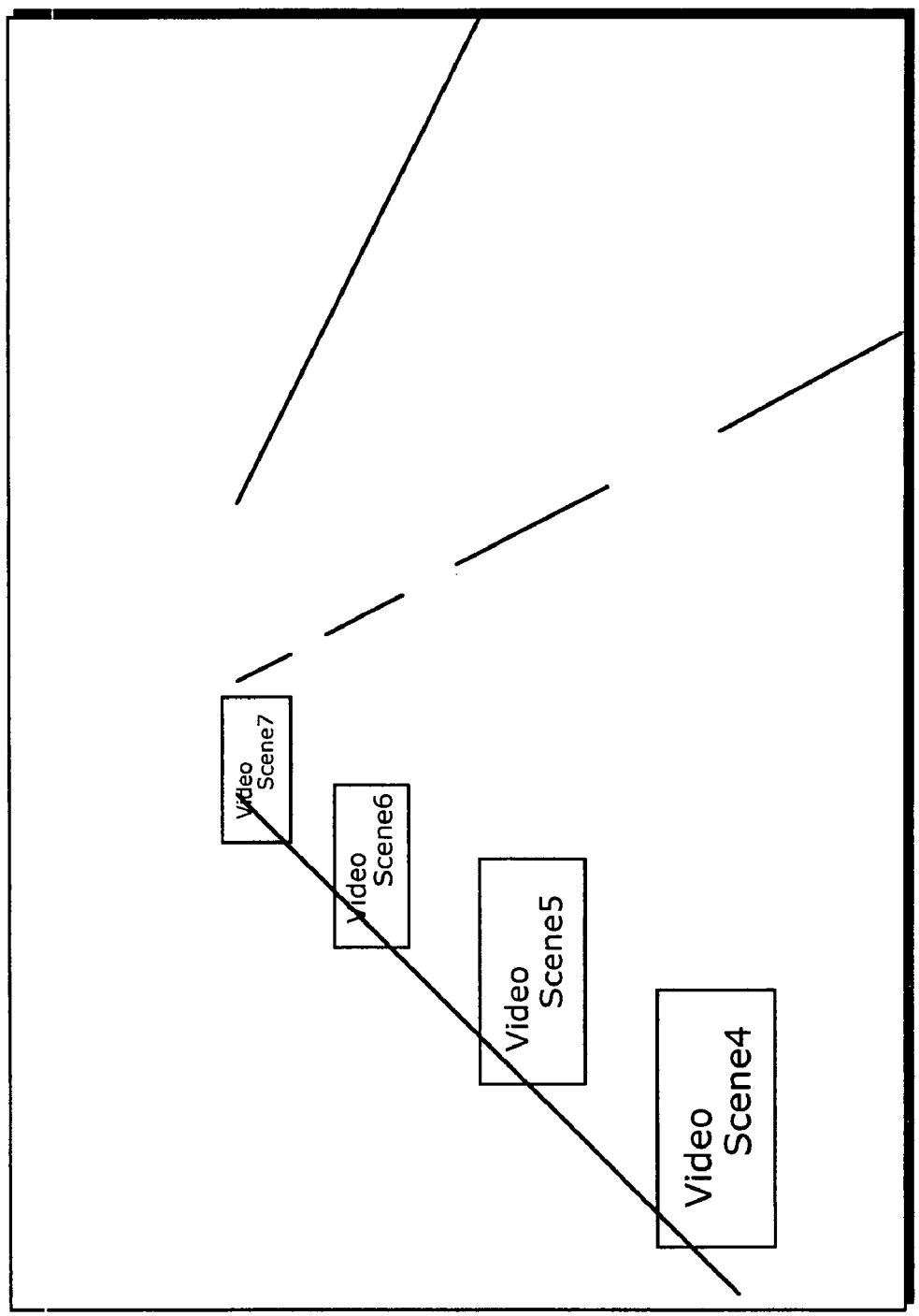
FIG. 32 is a diagram showing a state viewed from the user after 7 seconds.

Furthermore, the presented information is not limited to an electronic mail. The video of a television program may be divided per scene, and each of the scenes may be presented along a route of the user in chrolonological order. In other words, FIG. 29 indicates a state in which the user views after 0 second, FIG. 30 indicates the state after 2 seconds, FIG. 31 indicates the state after 4 seconds, and FIG. 32 indicates the state after 7 seconds.

It is obvious that presented information need not be divided into plural parts, in the case where the presented information is originally composed of plural parts. For example, since video of a television program is originally composed of plural scenes, an operation of dividing the video can be omitted. Assuming that an electronic mail is originally divided on a unit basis, such as "sender", "title", and "message body", it is possible to omit the dividing operation as the aforementioned video of a television program.

Furthermore, the operation may be performed first from either S201 or S203 in FIG. 5. In other words, the operation at S202 has only to be completed by S201, and the operation at S203 has only to be completed by S204. At the same time, the operation may be performed first from either S202 or S204. In other words, the operations at S202 and S204 have only to be completed by S205. It is obvious that each of the operations shown in FIG. 5 may be performed immediately and successively, performed in parallel, or performed at time interval.

Furthermore, a line of sight which is predicted at S202 or S204 in FIG. 5 need not be a single line of sight. In other words, plural lines of sight may be predicted, and each of the probabilities of the lines of sight to be achieved may be predicted.

FIG. 9B is a diagram showing another example of reference information stored in the observed line of sight prediction reference storage unit 107. Here, depending on the state of the user who is entering an intersection, the probability of occurrence of the state and the observed line of sight suitable for the state are associated with each other. More specifically, the probability of going straight is 80%, and in that case, it is specified that the observed line of sight is shifted in order from "right" to "left" to "front". Furthermore, the probability of turning right is 20%, and in that case, it is specified that the observed line of sight is shifted in order from "right" to "left" to "right". Furthermore, the probability of turning left is 0%, and in that case, it is specified that the observed line of sight is shifted in order from "left" to "right" to "left". Furthermore, the probability of returning to the original route is 0%, and in that case, it is specified that the observed line of sight is rotated by 180 degrees.

Then, when the user during walking is entering an intersection, the observed line of sight predicting unit 102 may predict two observed lines of sight based on the probability of going straight as 80% and the probability of turning right as 20%. In this case, since the probability of going straight is the highest, it is preferable to select an observed line of sight suitable for going straight. Note that when the user does not go straight but turns right it is preferable to change the observed line of sight to another observed line of sight which has been predicted in advance and is suitable for turning right.

Likewise, since the description of an electronic mail includes an important part and not important part, plural recognized lines of sight may be predicted, depending on the parts of the electronic mail.

FIG. 11B is a diagram showing another example of reference information stored in the recognized line of sight prediction reference storage unit 108. Here, depending on the importance for each parts of the electronic mail, the recognition speed suitable for reading each of the parts is specified. More specifically, the recognition speed is specified as: 3 letters per second at the most important part A; 4 letters per second at the second important part B; 5 letters per second at the third important part C; 6 letters per second at the fourth important part D; and 7 letters per second at the fifth important part E.

Then, the recognized line of sight predicting unit 104 determines the importance A to E for each of the parts in the electronic mail, and predicts the recognized line of sight when the part is read at the speed corresponding to the determined importance. With this, it becomes possible to allow the user to read an important part at a slow speed and a not important part at a fast speed.

Furthermore, although it is judged, in the aforementioned description, whether or not each size of the arrows D0, D2, D4, and D7 is equal to or less than 2 mm on the optical element 13, the present invention is not limited to this. In other words, it may be judged whether or not the difference in the angle between the lines of sight, for example, falls within 1 degree, or whether or not the distance between the recognized and observed lines of sight on the street overlapped with the presented information, for example, falls within 50 cm. When the distance between the recognized and observed lines of sight is 0, there are cases where the presented information hides an important scene. Thus, for example, when it is defined that the difference between the lines is between 5 mm and 2 mm, it is possible to set the difference 0 out of the range.

(Second Embodiment)

Next, the second embodiment of the present invention is described.

In the first embodiment, it is assumed that the user walks straight along the straight street in which there is no intersection. Thus, the street on which the user walks and the observed line of sight almost match. In the present embodiment, it is described that the street on which the user walks and the observed line of sight do not match.

Figure 33:
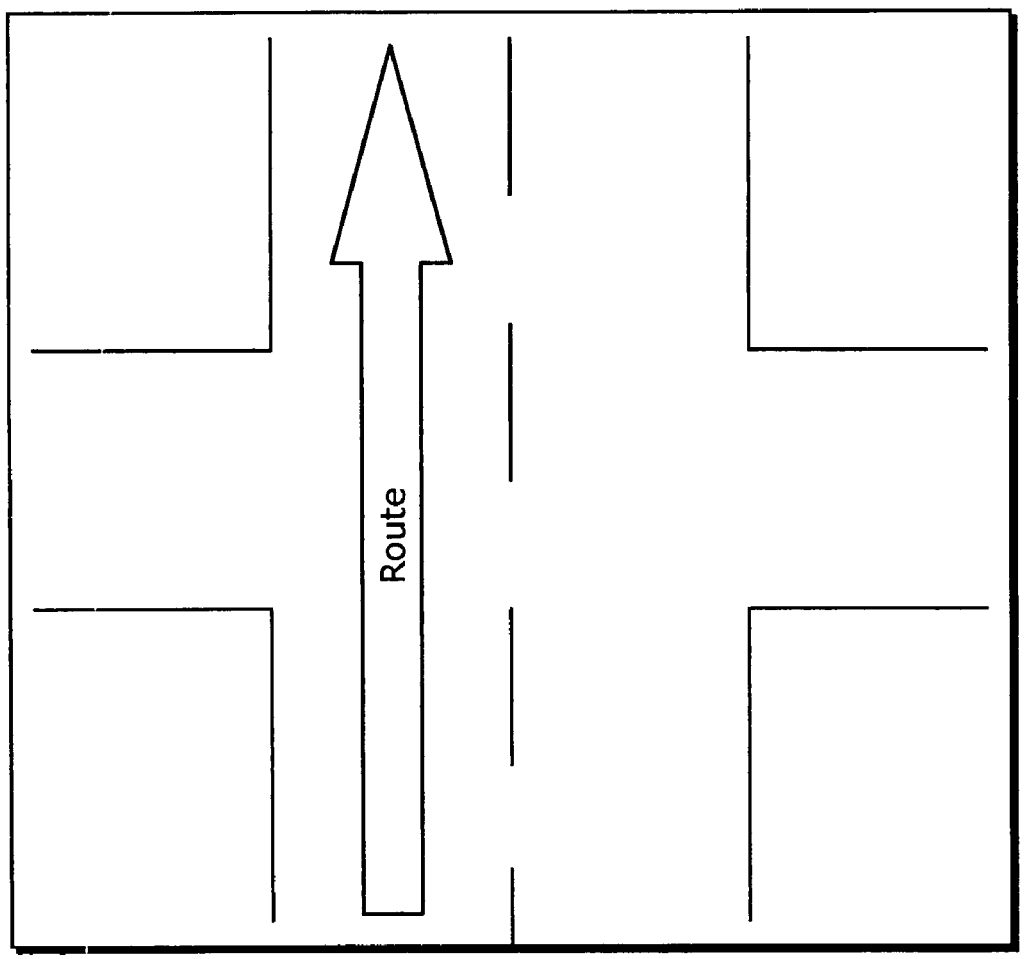
FIG. 33 is a diagram showing a state where the user during walking is going straight through an intersection.

FIG. 33 is a diagram showing a state when the user during walking goes straight at an intersection. When the user goes straight along the street, the walking route and the observed line of sight almost match. When the user goes straight at an intersection, it is preferable to make the observed line of sight shift between right and left so as to allow the user to look right and left at the intersection.

Figure 34:
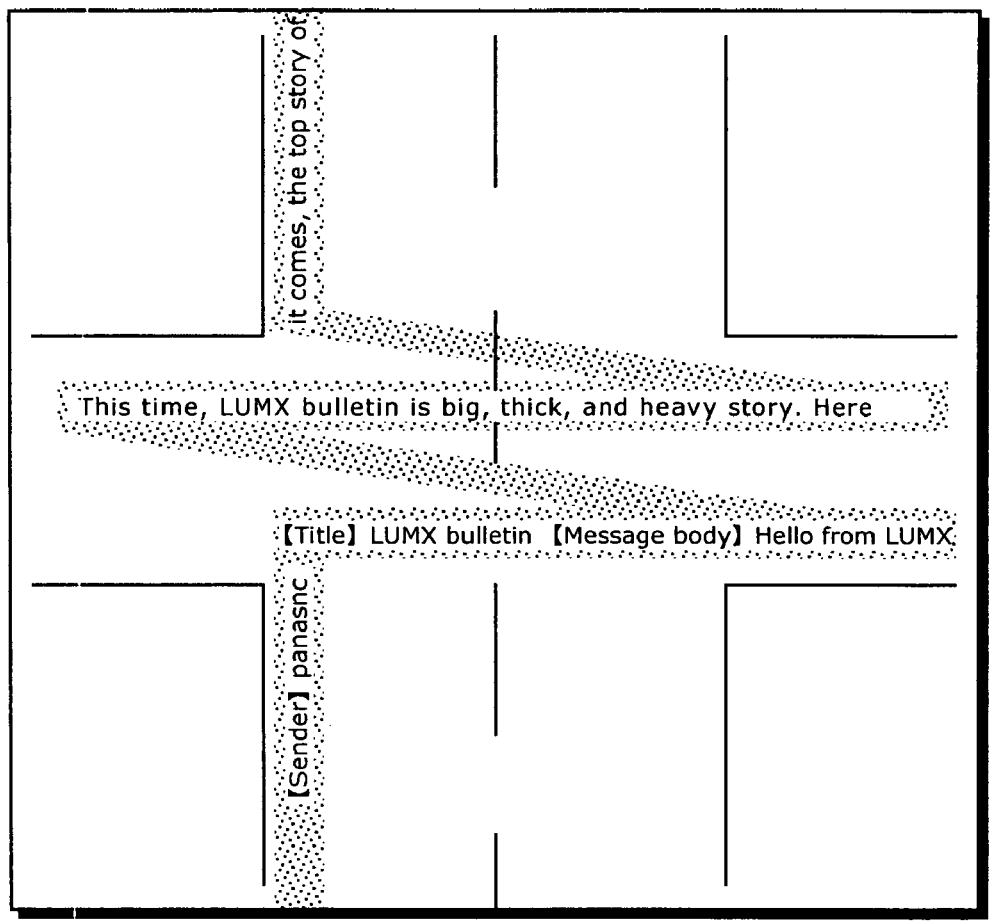
FIG. 34 is a diagram showing a walking route of the user who is going straight through an intersection.
Figure 35:
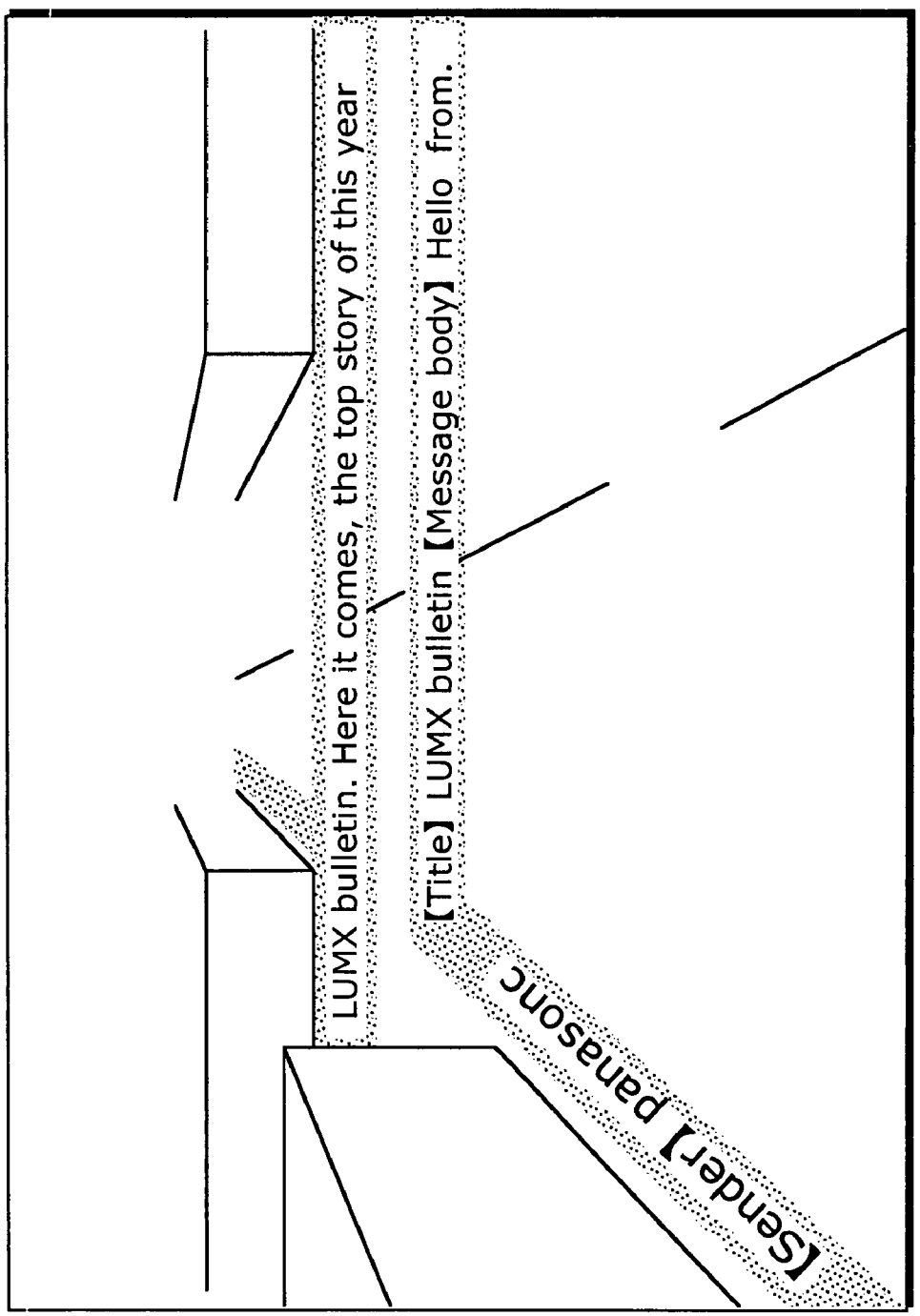
FIG. 35 is a diagram showing a state viewed from the user who is going straight through an intersection.

In other words, in such a case, as shown in FIG. 34, after the observed line of sight shifts from "right" to "left" to "right", it is predicted that the line returns to the forward direction of the route afterward. The electronic mail is placed according to the predicted movement. FIG. 35 is a diagram showing a scene viewed by the user when the electronic mail is placed in the aforementioned manner. When the electronic mail is read in order, the line of sight naturally shifts from "right" to "left" to "right" at the intersection. Thus, the user can look right and left at the intersection.

As clarified in the aforementioned description, according to the information presentation device of the present embodiment, it is possible to allow the user who goes straight at an intersection to look right and left at the intersection such that the safety of the user can be enhanced. Since the second embodiment is the same as the first embodiment in other points, the detailed description is omitted herein.

(Third Embodiment)

Next, the third embodiment of the present invention is described.

In the first embodiment, the configuration in which the parts of the presented information are placed uniformly along the route of the user is exemplified. In the present embodiment, parts of the information are unevenly placed respectively at different positions, with different distances, and with uneven distribution, depending on an object which influences a line of sight. In other words, the status information obtaining unit 101 obtains object information regarding an object which is present on a route of the user. Based on the object information obtained in such a manner, the presentation method determining unit 105 determines a method for presenting information.

Figure 36:
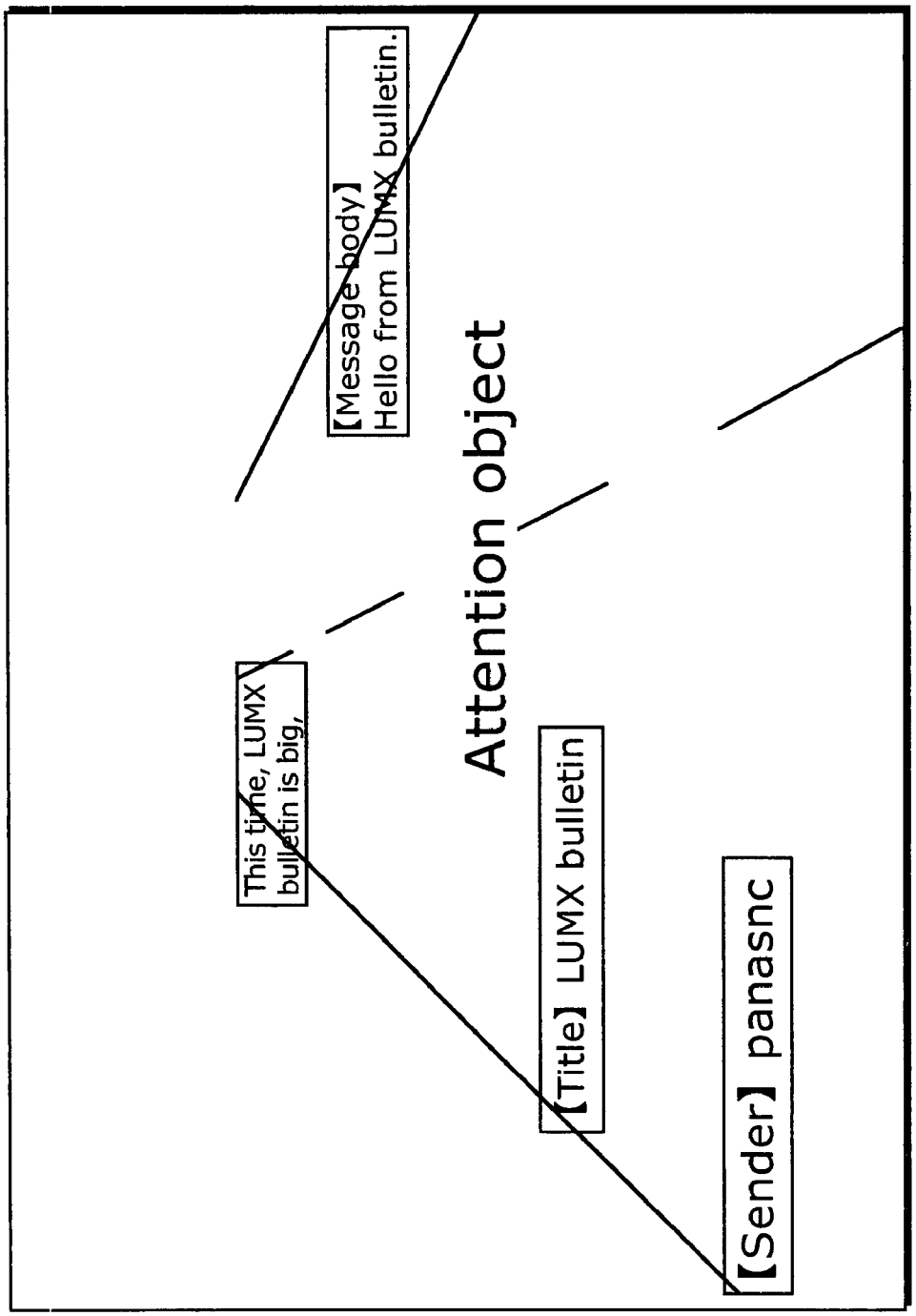
FIG. 36 shows a presentation example when the user who is walking straight is approaching an attention object.

FIG. 36 shows a presentation example when the user who is walking straight is approaching an attention object. Here, the attention object is an object to which the user needs to pay attention, for example, a bicycle. As such, when the user is approaching the attention object, it is preferable to place presented information so that the user looks to the vicinity of the attention object. Here, by placing "title" and "message body" of the electronic mail so as to sandwich the attention object, it is easier for the user to notice the attention object during a period when reading from "title" to "message body".

Figure 37:
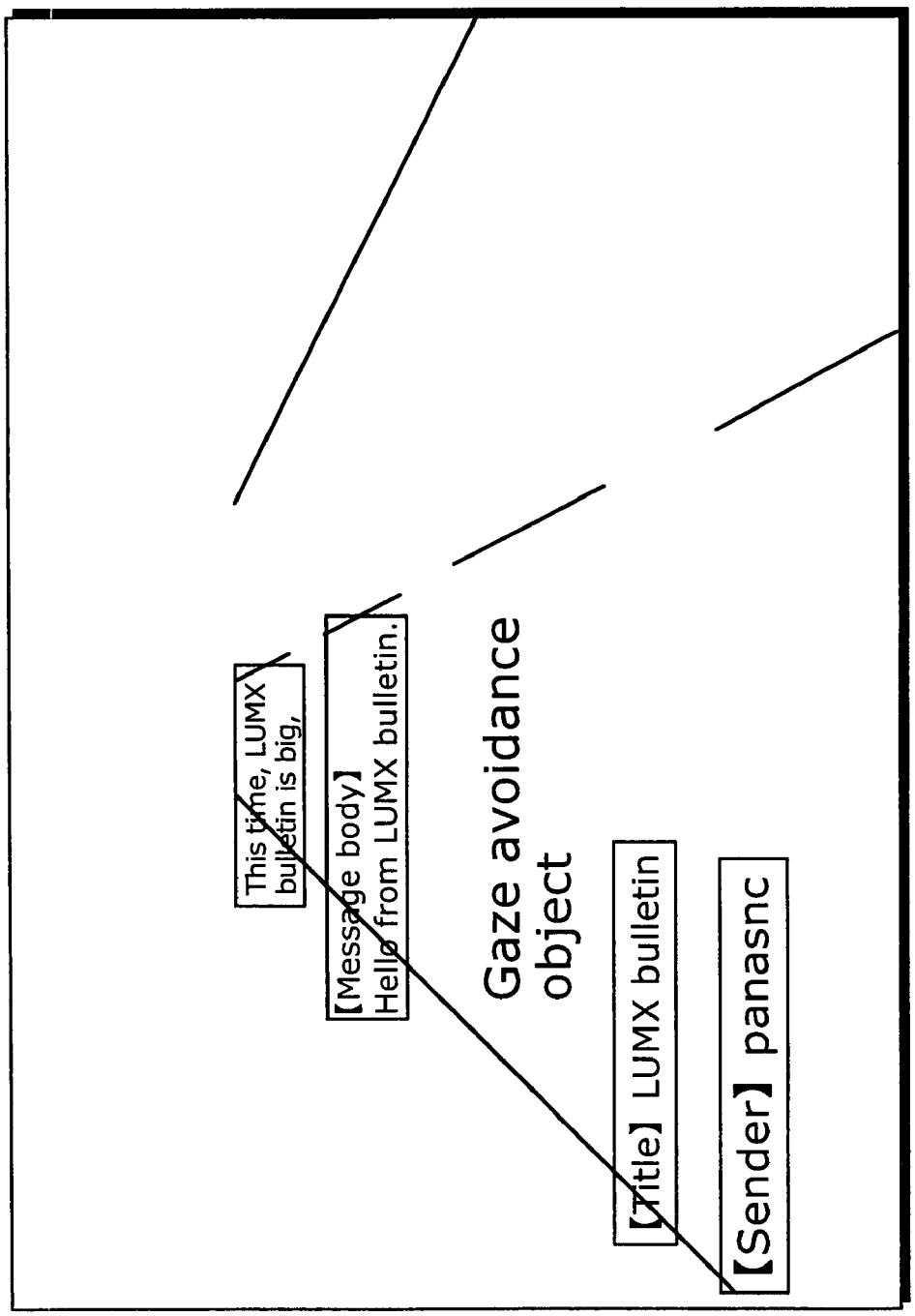
FIG. 37 shows a presentation example when the user who is walking straight is approaching a gaze avoidance object.

FIG. 37 shows a presentation example when the user who is walking straight is approaching a gaze avoidance object. Here, the gaze avoidance object is an object that should not be stared at excessively, for example, an unknown person. Thus, when the user is approaching a gaze avoidance object, as shown in FIG. 37, it becomes possible not to look to the gaze avoidance object for a long time by lowering a density of information in the vicinity of the gaze avoidance object. Note that it is possible to judge whether the object which is present along a route of the user is an attention object or a gaze avoidance object, by capturing a front scene and analyzing the captured image.

As clarified in the aforementioned description, according to the information presentation device of the present embodiment, it is possible to unevenly place parts of the information respectively at different positions, with different distances, and with uneven distribution according to an object which influences a line of sight. Thus, it becomes possible to enhance the safety of the user. Since the third embodiment is the same as the first embodiment in other points, the detailed description is omitted herein.

Note that each of the units shown in FIG. 2 may be within a single computer or may not be within the computer. For example, the presentation method determining unit 105 and the information presenting unit 106 may be respectively set in a separate apparatus, or the presented information obtaining unit 103 may be a server device on the Internet. Furthermore, each of the units may be distributed among plural computers, or each of the units shown in FIG. 2 (for example, the information presenting unit 106) may be plural units on a single computer. It is obvious that plural users may share each unit in FIG. 2.

Furthermore, although a see-through HMD is exemplified herein, the present invention is not limited to this. In other words, the present invention can be applied to a hermetically-closed HMD in which an image of the outside world captured by a camera and the like is superimposed with a virtual image and the image is displayed on a display apparatus, such as an LCD. Furthermore, the information presenting unit 106 may include: a head mounted display; a face mounted display; a goggle-type display; a see-through display; a retina-scanning display; an information presenting unit in a cellular phone, a portable television, and a mobile terminal; a projector; or the like. It is obvious that the present invention can be applied to not only an HMD but also an apparatus including the units shown in FIG. 2.

Furthermore, there are various methods for predicting a line of sight, and the method is not limited to the aforementioned method. For example, it is possible to predict a line of sight by extracting a feature point of eyes (such as a boundary between the white and black of the eyes) from video of the eyeballs captured by a camera. Alternatively, it is also possible to predict a line of sight by adding identification information, such as a mark, on a contact lens or a surface of an eyeball and recognizing the position. Alternatively, it is also possible to predict a line of sight by measuring the electric resistance in the vicinity of an eyeball, and a change in an electric characteristic of an electric current and a voltage. Alternatively, for example, it is also possible to predict a line of sight by using human physical conditions in that a line of sight moves according to the movement of the body and the head. For example, a condition "when the head turns left, the sight point also moves left" is used. Alternatively, for example, based on the general knowledge, such as looking right and left at an intersection, or based on an individual preference, for example, a particular user shows an interest to a kitten, it is also possible to predict a line of sight by estimating the strength of the user's interest in a status or an object present in the vicinity of the user from a view point that the user pays attention to an object of interest. Note that an eye to be an object for predicting a line of sight may be either right or left eyes, or both eyes. Furthermore, although a line of sight is predicted herein, prediction of a sight point or an attention point is substantially equivalent to the prediction of a line of sight. It is obvious that the destination of a predicted line of sight may be a region instead of a point. For example, it is possible to predict a region including a line of sight to be recognized and observed by the user, in a case where "the user views the left side after 2 seconds", for example.

Furthermore, although a position in which information is presented is changed herein, one of characteristics of the information to be presented, such as the color, brightness, transparent degree, direction, and depth may be changed. Alternatively, the reproduction states of presented information, such as pause, restart, suspension, forward, rewind, slow reproduction, highlight reproduction, and partial reproduction may be changed. Furthermore, a presentation method may be intermittently changed. For example, when the presentation position is changed, once the presentation is suspended, the information may be presented in a position which is different from the previous position.

Furthermore, although an electronic mail and a television program are used as presented information herein, the presented information has only to include at least one of: video, such as a television program; text, such as an electronic mail; a still image; and a signal. Furthermore, although a method for managing presented information is not particularly mentioned herein, the following methods may be adopted: a method in which the presented information obtaining unit 103 itself holds the whole presented information or a part of the information; a method in which a position of the presented information is held so as to obtain the presented information; and a method in which a position of another presented information obtaining unit which holds the position of presented information is held.

Furthermore, although the method for presenting information is determined herein so that the difference between an observed line of sight and a recognized line of sight falls within a predetermined range, the present invention is not limited to such determining method. In other words, it is possible to determine a presentation method: so that either of a recognized line of sight or an observed line of sight precedes the other; so as to suspend the presentation of the information according to the movement of the observed line of sight; or so as to change the activity of the user.

The information presentation device according to the present invention is useful as an information presentation device which presents information to a user, in particular, as an HMD and the like which is necessary to allow the user to recognize presented information while the safety of the user is further ensured.

The invention claimed is:

1. An information presentation device which presents information on a see-through presentation screen to a user, the information presentation device comprising:
   a status information obtaining unit operable to obtain status information regarding a status of the user;
   an observed line of sight predicting unit operable to predict, on a predetermined time basis, a future sight point of an observed line of sight from eyes of a user to an observation target in the outside world through the presentation screen, based on the status information obtained by the status information obtaining unit;
   a presented information obtaining unit operable to obtain information to be presented to the user as presented information, the presented information including one of text, video, image and signal information;
   a recognized line of sight predicting unit operable to predict, on the predetermined time basis, a future sight point of a recognized line of sight from the eyes of the user to a point on the presentation screen on which the information obtained by the presented information obtaining unit is presented, based on a predetermined rule depending on a type and an importance of the presented information;
   a presentation method determining unit operable to obtain, on the predetermined time basis, an intersection point of the observed line of sight and a plane, and an intersection point of the recognized line of sight and the plane, and to determine a presentation method of the presented information so that a distance between the intersection points falls within a predetermined range; and
   an information presenting unit operable to present the presented information in the presentation method, the presented information being obtained by the presented information obtaining unit and the presentation method being obtained by the presentation method determining unit.

2. The information presentation device according to claim 1,
   wherein the presentation method determining unit is operable to place the presented information so as to allow the user to look to a safe direction.

3. The information presentation device according to claim 1,
   wherein the status information obtaining unit is operable to obtain information regarding a route of the user, and
   the presentation method determining unit is operable to projectively place the presented information along the route of the user.

4. The information presentation device according to claim 1,
wherein the status information obtaining unit is operable to obtain information regarding a route of the user, and
the presentation method determining unit is operable to place parts of the presented information in chronological order along the route of the user.

5. The information presentation device according to claim 1,
wherein the status information obtaining unit is operable to obtain information regarding a route of the user, and
the presentation method determining unit is operable to place the presented information at a position of an intersection in which the user looks right and left, when the user is entering the intersection.

6. The information presentation device according to claim 1,
wherein the recognized line of sight predicting unit is operable to divide the presented information into plural parts, and
the presentation method determining unit is operable to determine a presentation method for each of the divided parts.

7. The information presentation device according to claim 1,
wherein the status information obtaining unit is operable to obtain object information regarding an object which is present on a route of the user, and
the presentation method determining unit is operable to place the presented information so that the user looks to the object.

8. The information presentation device according to claim 1,
wherein the status information obtaining unit is operable to obtain object information regarding an object which is present on a route of the user, and
the presentation method determining unit is operable to place the presented information so that the user does not look to the object.

9. The information presentation device according to claim 1, the information presentation device further comprising:
a sensor which detects a line of sight of the user who observes the outside world,
wherein the observed line of sight predicting unit is operable to use the detected line of sight as the observed line of sight.

10. The information presentation device according to claim 1,
wherein the observed line of sight predicting unit is operable to predict plural observed lines of sight depending on statuses of the user which are probable to occur, the observed lines of sight being suitable for each of the statuses.

11. The information presentation device according to claim 1,
wherein the recognized line of sight predicting unit is operable to predict plural recognized lines of sight depending on respective parts of the presented information, the recognized lines of sight having respective speeds suitable for recognizing each of the parts.

12. An information presentation method for presenting information on a see-through presentation screen to a user, the method comprising:
a status information obtaining step of obtaining status information regarding a status of the user;
an observed line of sight predicting step of predicting, on a predetermined time basis, a future sight point of an observed line of sight eyes of a user to an observation target in the outside world through the presentation screen, based on the status information obtained in the status information obtaining step;
a presented information obtaining step of obtaining information to be presented to the user as presented information, the presented information including one of text, video, image and signal information;
a recognized line of sight predicting step of predicting, on the predetermined time basis, a future sight point of a recognized line of sight from the eyes of the user to a point on the presentation screen on which the information obtained in the presented information obtaining step is presented, based on a predetermined rule depending on a type and an importance of the presented information;
a presentation method determining step of obtaining, on the predetermined time basis, an intersection point of the observed line of sight and a plane, and an intersection point of the recognized line of sight and the plane, and determining a presentation method of the presented information so that a distance between the intersection points falls within a predetermined range; and
an information presenting step of presenting the presented information in the presentation method, the presented information being obtained in the presented information obtaining step and the presentation method being obtained in the presentation method determining step.

13. A non-transitory computer-readable recording medium on which a program for presenting information on a see-through presentation screen to a user is recorded, the program causing a computer to execute steps comprising:
a status information obtaining step of obtaining status information regarding a status of the user;
an observed line of sight predicting step of predicting, on a predetermined time basis, a future sight point of an observed line of sight from eyes of a user to an observation target in the outside world through the presentation screen, based on the status information obtained in the status information obtaining step;
a presented information obtaining step of obtaining information to be presented to the user as presented information, the presented information including one of text, video, image and signal information;
a recognized line of sight predicting step of predicting, on the predetermined time basis, a future sight point of a recognized line of sight from the eyes of the user to a point on the presentation screen on which the information obtained in the presented information obtaining step is presented, based on a predetermined rule depending on a type and an importance of the presented information;
a presentation method determining step of obtaining, on the predetermined time basis, an intersection point of the observed line of sight and a plane, and an intersection point of the recognized line of sight and the plane, and determining a presentation method of the presented information so that a distance between the intersection points falls within a predetermined range; and
an information presenting step of presenting the presented information in the presentation method, the presented information being obtained in the presented information obtaining step and the presentation method being obtained in the presentation method determining step.

* * * * *